United States Patent
Bhattad et al.

(10) Patent No.: US 11,863,331 B2
(45) Date of Patent: Jan. 2, 2024

(54) DETERMINING PRIORITIES FOR A PLURALITY OF TRANSPORT BLOCKS FOR TRANSMISSION

(71) Applicant: QUALCOMM INCORPORATED, San Diego, CA (US)

(72) Inventors: Kapil Bhattad, Bangalore (IN); Jing Sun, San Diego, CA (US); Pravjyot Singh Deogun, Bengaluru (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/948,843

(22) Filed: Oct. 1, 2020

(65) Prior Publication Data

US 2021/0105103 A1    Apr. 8, 2021

(51) Int. Cl.
| | |
|---|---|
| *H04L 5/00* | (2006.01) |
| *H04L 1/1867* | (2023.01) |
| *H04L 1/1812* | (2023.01) |
| *H04W 72/566* | (2023.01) |
| *H04L 1/1829* | (2023.01) |
| *H04W 72/23* | (2023.01) |

(52) U.S. Cl.
CPC .......... *H04L 1/1887* (2013.01); *H04L 1/189* (2013.01); *H04L 1/1812* (2013.01); *H04L 1/1819* (2013.01); *H04L 1/1864* (2013.01); *H04L 5/0055* (2013.01); *H04W 72/23* (2023.01); *H04W 72/569* (2023.01)

(58) Field of Classification Search
CPC ... H04L 1/1887; H04L 1/1812; H04L 1/1816; H04L 1/1819; H04L 1/1822; H04L 1/1825; H04L 1/1864; H04L 1/189; H04L 5/0055; H04W 72/1242; H04W 72/569; H04W 72/23
See application file for complete search history.

(56) References Cited

U.S. PATENT DOCUMENTS

| | | | |
|---|---|---|---|
| 2018/0131473 A1* | 5/2018 | Moon | H04W 72/0413 |
| 2019/0166627 A1* | 5/2019 | Takeda | H04W 76/27 |

(Continued)

FOREIGN PATENT DOCUMENTS

| | | |
|---|---|---|
| CN | 109150421 A | 1/2019 |
| EP | 3648384 A1 | 5/2020 |
| WO | WO-2018223877 A1 * 12/2018 | ............... H04L 1/00 |

OTHER PUBLICATIONS

U.S. Appl. No. 62/758,038, filed Nov. 9, 2018.*

(Continued)

*Primary Examiner* — Omar J Ghowrwal
(74) *Attorney, Agent, or Firm* — Haynes and Boone, LLP

(57) ABSTRACT

Wireless communications systems and methods related to unscheduled uplink hybrid automatic repeat request (HARQ) data transmissions in a shared radio frequency band are provided. A user equipment (UE) determine priorities for a plurality of transport blocks (TBs) associated with a plurality of hybrid automatic repeat request (HARQ) processes for transmission during configured transmission periods. The UE transmits, to a base station (BS), the plurality of TBs in a shared radio frequency band during the configured transmission periods based on the determined priorities.

30 Claims, 12 Drawing Sheets

(56) References Cited

U.S. PATENT DOCUMENTS

2020/0154469 A1* 5/2020 Chin ................. H04W 72/0446
2021/0084674 A1* 3/2021 Wei ....................... H04W 72/14
2021/0345408 A1* 11/2021 Loehr ................... H04L 5/0055

OTHER PUBLICATIONS

U.S. Appl. No. 62/899,883, filed Sep. 13, 2019.*
English Translation of WO-2018223877-A1, 2018, [retrieved on Jun. 22, 2023]. Retrieved from PE2E Search. (Year: 2018).*
CATT: "Data/data Prioritization Timeline", 3GPP Draft, 3GPP TSG-RAN WG2 Meeting #107, R2-1908827, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 16, 2019 (Aug. 16, 2019), XP051766649, 3 pages, Retrieved from the Internet: URL: http://www.3gpp.org/ftp/tsg_ran/WG2_RL2/TSGR2_107/Docs/R2-1908827.zip [retrieved on Aug. 16, 2019] section 2.
International Search Report and Written Opinion—PCT/US2020/054161—ISA/EPO—dated Jan. 27, 2021.
Nokia, et al., "Multiple Configured Grants Per BWP for NR-U", 3GPP Draft, 3GPP TSG-RAN WG2 Meeting #107, R2-1910092, Multiple Configured Grants for NR-U, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019-Aug. 30, 2019, Aug. 16, 2019 (Aug. 16, 2019), XP051767877, 2 pages [Continued in Box 4]. [Continued from Box 3] Retrieved from the Internet: URL: http://www.3gpp.org/ftp/tsg_ran/WG2_RL2/TSGR2_107/Docs/R2-1910092.zip [retrieved on Aug. 16, 2019] section 2.
ZTE: "Other Enhancements for Rel-16 URLLC", 3GPP Draft; 3GPP TSG RAN WG1 #98, R1-1908241, Other Enhancements for REL-16 URLLC, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 17, 2019 (Aug. 17, 2019), XP051764855, 13 pages, Retrieved from the Internet: URL: http://www.3gpp.org/ftp/tsg_ran/WG1_RL1/TSGR1_98/Docs/R1-1908241.zip [retrieved on Aug. 17, 2019] section 2.3.

* cited by examiner

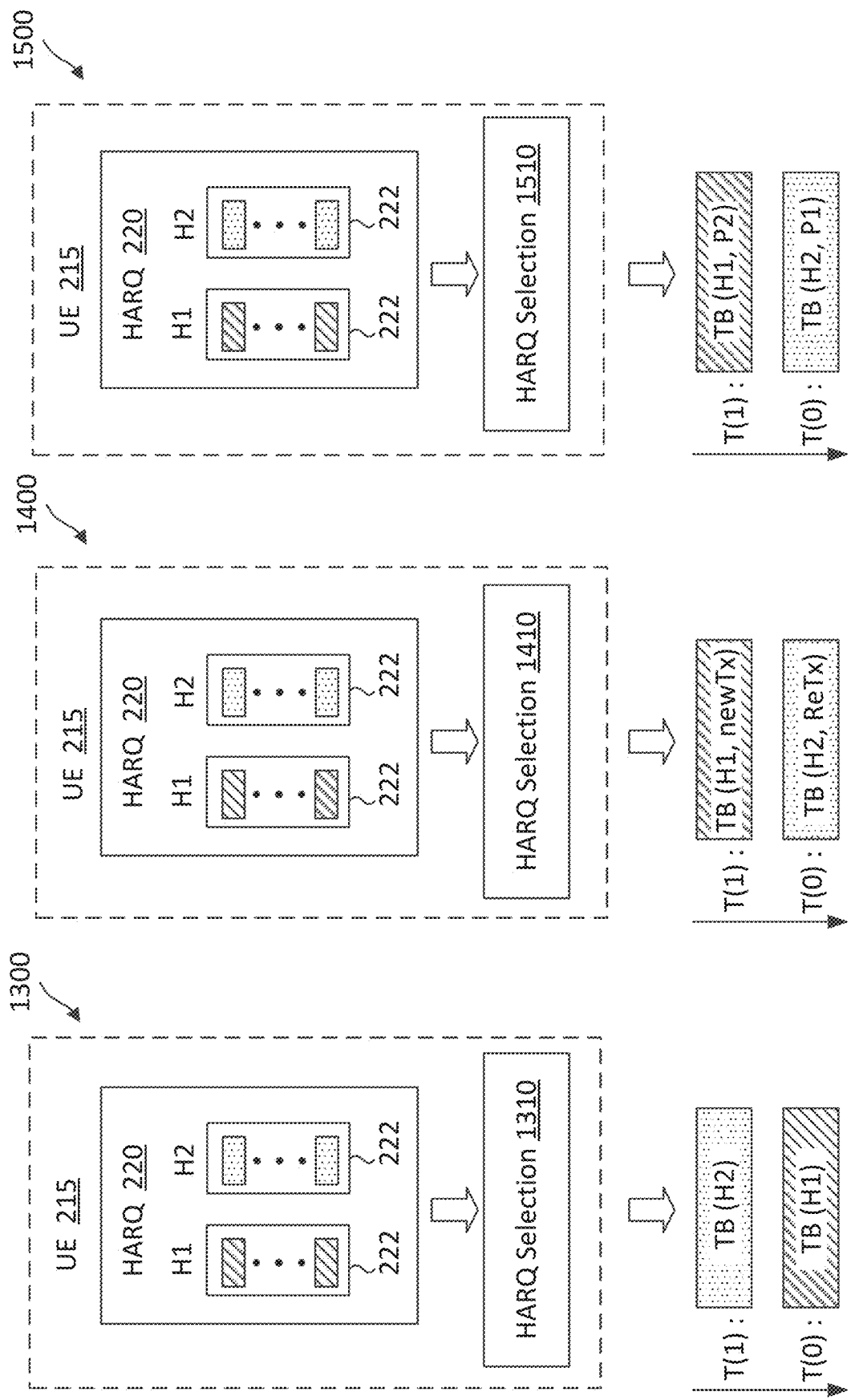

DETERMINING PRIORITIES FOR A PLURALITY OF TRANSPORT BLOCKS FOR TRANSMISSION

CROSS REFERENCE TO RELATED APPLICATIONS

The present application claims priority to and the benefit of Indian Provisional Patent Application No. 201941039983, filed Oct. 3, 2019, which is hereby incorporated by reference in its entirety as if fully set forth below and for all applicable purposes.

TECHNICAL FIELD

This application relates to wireless communication systems, and more particularly to unscheduled uplink hybrid automatic repeat request (HARQ) data transmissions in a shared radio frequency band.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may proceed with the transmission. When the channel is busy, the transmitting node may refrain from transmitting in the channel.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes determining, by a user equipment (UE), priorities for a plurality of transport blocks (TBs) associated with a plurality of hybrid automatic repeat request (HARQ) processes for transmission during configured transmission periods; and transmitting, by the UE to a base station (BS), the plurality of TBs in a shared radio frequency band during the configured transmission periods based on the determined priorities.

In an additional aspect of the disclosure, a user equipment (UE) includes a processor configured to determine priorities for a plurality of transport blocks (TBs) associated with a plurality of hybrid automatic repeat request (HARQ) processes for transmission during configured transmission periods; and a transceiver configured to transmit, to a base station (BS), the plurality of TBs in a shared radio frequency band during the configured transmission periods based on the determined priorities.

In an additional aspect of the disclosure, a non-transitory computer-readable medium having program code recorded thereon, the program code includes code for causing a user equipment (UE) to determine priorities for a plurality of transport blocks (TBs) associated with a plurality of hybrid automatic repeat request (HARQ) processes for transmission during configured transmission periods; and code for causing the UE to transmit, to a base station (BS), the plurality of TBs in a shared radio frequency band during the configured transmission periods based on the determined priorities.

In an additional aspect of the disclosure, a user equipment (UE) including means for determining priorities for a plurality of transport blocks (TBs) associated with a plurality of hybrid automatic repeat request (HARQ) processes for transmission during configured transmission periods; and means for transmitting, to a base station (BS), the plurality of TBs in a shared radio frequency band during the configured transmission periods based on the determined priorities.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 illustrates a HARQ transmission scheme using configured resources according to some aspects of the present disclosure.

FIG. 14 illustrates a HARQ transmission scheme using configured resources according to some aspects of the present disclosure.

FIG. 15 illustrates a HARQ transmission scheme using configured resources according to some aspects of the present disclosure.

DETAILED DESCRIPTION

Figure 1:
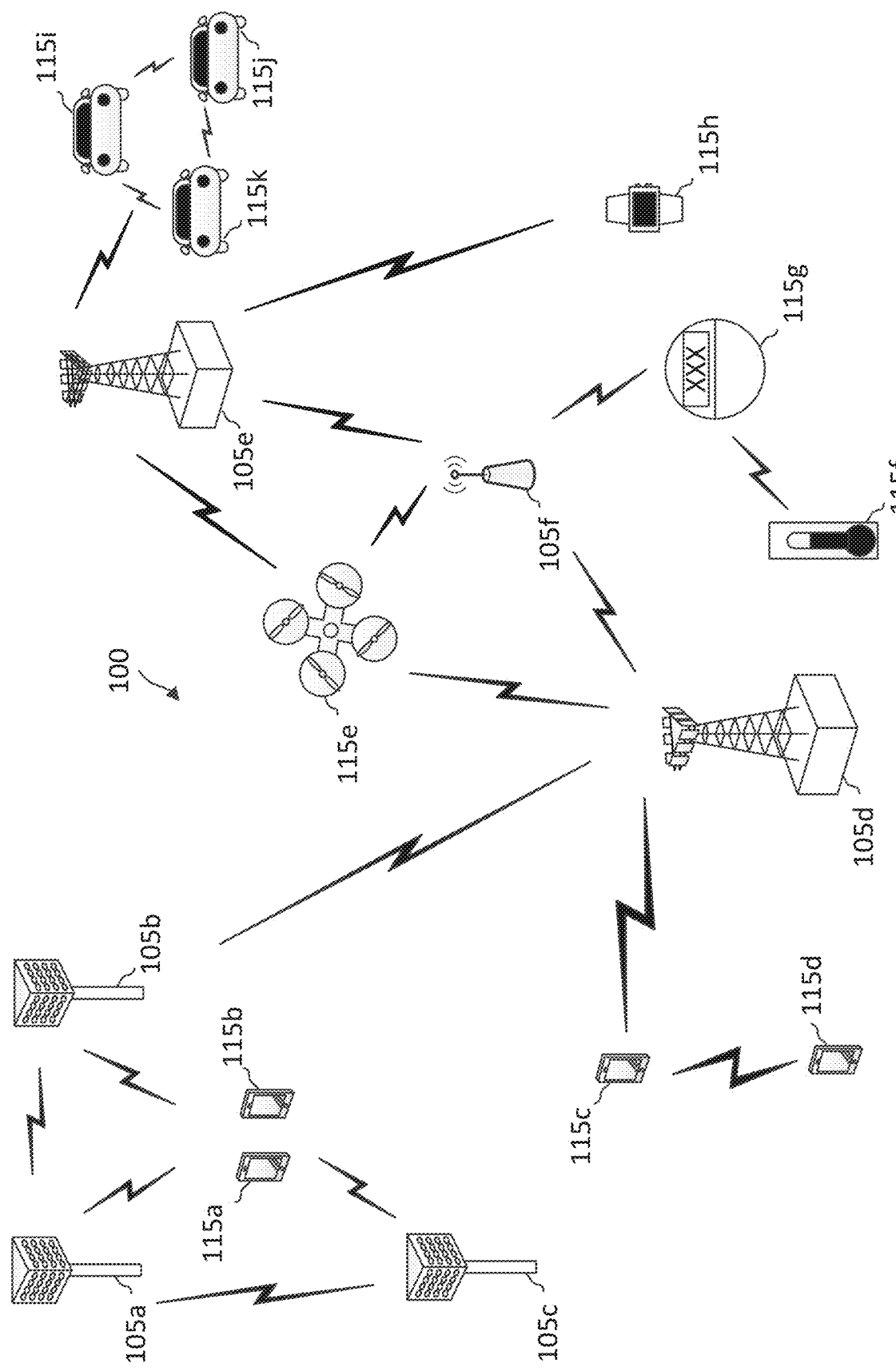
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a base station (BS) may configure a use equipment (UE) with a configured grant for autonomous transmission or non-scheduled transmission. Each configured grant is associated with a set of resources configured for the UE to transmit UL communications (e.g., data and/or control information) without being scheduled by the BS. The set of configured resource may occur periodically. The set of configured resources may correspond to transmission time occasions. In some instances, the UE may use the configured resources for autonomous or non-scheduled uplink data transmission. To improve communication reliability, the UE may apply hybrid automatic repeat request (HARQ) techniques to the UL data transmission. Additionally, the UE may perform the UL data transmission with repetitions using different redundancy versions to improve decoding performance at the BS. When operating over a licensed band, the BS may assign a HARQ process and/or a HARQ redundancy version for transmission in each transmission time occasion. In other words, the BS may provide a mapping or association between HARQ process/redundancy version to configured resource in the time domain. The UE may transmit UL HARQ data in the configured transmission occasions based on the association.

The present application describes mechanisms for unscheduled UL HARQ transmission using configured grant resources in a shared radio frequency band, which may be in a shared spectrum or an unlicensed spectrum. For example, a BS may configure a UE with a set of configured resources and a plurality of redundancy versions (RVNs) for unscheduled UL HARQ transmission using the configured resources. The UE may determine a RV sequence from the plurality of RVNs. The UE may map the RV sequence to transmission slots within a configured resource transmit one or more redundancy versions of a transport block (TB) during one or more transmission slots within the configured resource. The UE may perform a listen-before-talk (LBT) prior to a transmission and may transmit the one or more redundancy versions of the TB after a successful LBT.

In some aspects, the UE may perform the RV mapping for successful transmissions. For instance, the UE may select a RVN from the RV sequence sequentially for each slot in the configured resource beginning at a slot where an initial transmission TB can be transmitted (e.g., after passing the LBT). In some aspects, the UE may perform the RV mapping beginning at a sot associated with an earliest LBT attempt irrespective of whether a transmission attempt is successful or not. For instance, the UE may select a RVN from the RV sequence sequentially for each slot in the configured resource beginning at a slot where a first transmission attempt is performed. In some instances, the UE may cyclically wrap the RV sequence after using up all the RVN in the sequence for mapping. In some aspects, the UE may order the plurality of RVNs in any suitable order in the RV sequence. In some aspects, the BS may configure the UE with a RV sequence including a set of RVNs arranged in a certain order, and thus the UE may use the configured RV sequence for RV-to-slot mapping. In some aspects, the BS may configured the UE with RV-to-slot-mapping.

In some aspects, the UE may retransmit the TB in a subsequent configured resource. In some instances, the UE may reinitiate a RV mapping for the retransmission in the subsequent configured resource using the same mapping mechanisms as for the initial transmission. In some instances, the UE may resume from a last RVN in the RV sequence used in the initial transmission. In some instances, the UE may transmit one or more redundancy versions of the TB using any RVNs.

In some aspects, the UE may prioritize TBs of different HARQ processes for unscheduled transmission in a configured resource. In other words, the UE may determine priorities for the TBs of the different HARQ processes for unscheduled transmission in the configured resource. In some instances, the UE may transmit TBs of different HARQ process in the order of MAC PDU preparation order. In some instances, the UE may prioritize a retransmission over an initial transmission. In some instances, the UE may prioritize the TBs of the different HARQ processes based on data priorities and/or latency requirements of the HARQ processes. In other words, the UE may determine priorities for the TBs of the different HARQ processes based on the data priorities and/or latency requirements of the HARQ processes.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel A TXOP may also be referred to as channel occupancy time (COT).

In some aspects, when operating over a shared radio frequency band in a shared spectrum or unlicensed spectrum, a BS 105 may configure a UE 115 with configured resources for autonomous UL data transmission. The configured resources may be repeated at a certain time interval. The UE 115 may use the configured resources for UL HARQ data transmission without being scheduled dynamically by the BS 105. Each configured resource may include a set of consecutive transmission slots or time periods. The BS 105 may configure the UE with a set of RVNs. The UE 115 may determine an order for mapping the configured RVNs to the set of slots or transmission periods. The UE 115 may transmit one or more redundancy versions of a TB in consecutive slots or time periods within a configured resource. The UE 115 may also prioritize HARQ processes and/or TBs for transmissions in the configured resources. In other words, the UE 115 may determine priorities for the HARQ processes and/or the TBs for transmissions in the configured resources. Mechanisms for transmitting UL HARQ data using configured resources in a shared radio frequency band are described in greater detail herein.

Figure 2:
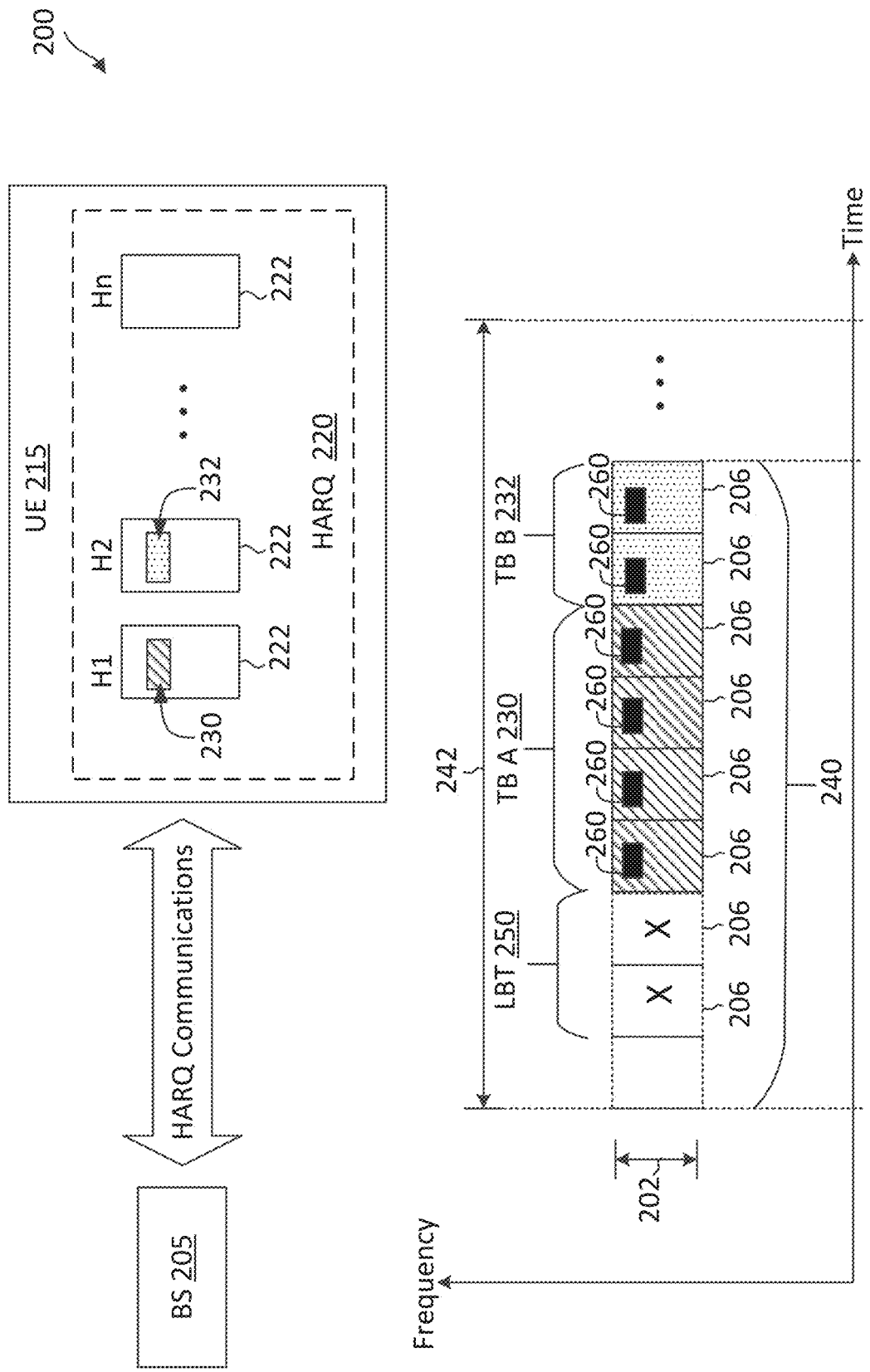
FIG. 2 illustrates a hybrid automatic repeat request (HARQ) communication scenario in a shared radio frequency band according to some aspects of the present disclosure.

FIG. 2 illustrates a HARQ communication scenario 200 in a shared radio frequency band according to some aspects of the present disclosure. The scenario 200 may correspond to a HARQ communication scenario in the network 100 when the network 100 operates over a shared frequency band or an unlicensed frequency band. In FIG. 2, the x-axis represents time in some constant units. In the scenario 200, a BS 205 similar to the BSs 105 may communicate data with a UE 215 similar to the UEs 115 using HARQ over a frequency band 202, which may be a shared radio frequency band in a shared spectrum or an unlicensed spectrum, shared by multiple network operating entities. The frequency band 202 may be located at any suitable frequencies. In some aspects, the frequency band 202 may be located at about 3.5 GHz, 6 GHz, or 30 GHz.

For HARQ communications, a transmitting node (e.g., the UE 215) may transmit data (e.g., in the form of a TB) to a receiving node (e.g., the BS 205). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In some instances, the transmitting node may use the same encoding version for the initial transmission and the retransmission. In some other instances, the transmitting node may use different encoding versions for the initial transmission and the retransmission. The encoding versions may be referred to as redundancy versions. Different redundancy versions may include different combinations of systematic data information bits and error correction bit. In some aspects, the receiving node may perform soft-combining to decode the data based on the initial transmission and the retransmission. For simplicity of discussion and illustration, FIG. 2 illustrates the HARQ communication in the context of UL data communications, though similar HARQ mechanisms may be applied to DL data communications.

As an example, the UE 215 includes a HARQ component 220. The HARQ component 220 is configured to perform multiple parallel HARQ processes 222 for UL data communications. The HARQ processes 222 may operate independent of each other. In other words, the ACKs, NACKs, and/or retransmissions are determined and processed separately for each HARQ process 222 at the BS 205 and at the UE 215. Each HARQ process 222 may be identified by a HARQ process identifier (ID). For example, the HARQ processes 222 may be identified by identifiers H1, H2, . . . Hn. Each HARQ process 222 may have one or more TBs ready for transmission. In the illustrated example of FIG. 2, the HARQ process H1 222 has one TB 230 ready for transmission and the HARQ process H2 222 has one TB 232 ready for transmission. The BS 205 may configure the UE 215 with configured resources for autonomous or unscheduled transmission. The UE 215 may transmit the TB 230 and the TB 232 to the BS 205 using a configured resource.

In some aspects, the BS 205 may configure the UE 215 with a configured resource 240. The configured resource 240 may be periodic. For instance, the configured resource 240 may repeated at a time interval 242. The configured resource 240 may be partitioned into a plurality transmission time periods or slots 206. Each slot 206 may include any suitable number of OFDM symbols depending on the transmission configurations or numerology (e.g., the subcarrier spacing (SCS) and/or the cyclic prefix (CP) mode) in use.

The UE 215 may perform an LBT 250 in the frequency band 202 prior to a transmission. As an example, a first LBT 250 attempt for a transmission in a second slot 206 within the configured resource 240 failed (shown by the cross symbol). A second LBT 250 attempt for a transmission in a third slot 206 within the configured resource 240 also failed (shown by the cross symbol). A third LBT attempt for a transmission in a fourth slot 206 within the configured resource 240 is a pass. Thus, the UE 215 may initiate a transmission beginning at the fourth slot 206. Once the UE 215 won a contention (e.g., passing the LBT 250), the UE 215 may use the configured resource for a number of consecutive HARQ transmissions.

In the illustrated example of FIG. 2, after passing the LBT 250, the UE 215 transmits four repetitions of the TB 230, denoted as TB A, followed by two repetitions of the TB 232, denoted as TB B, in consecutive slots 206. In some aspects, the UE 215 may transmit the repetitions for the TB 230 using different redundancy versions and/or the same redundancy versions. In some instances, each repetition may use a different RVN. In some instances, all repetitions may use the same RVN. In some instances, at least two repetitions may use the same RVN. Similarly, the UE 215 may transmit the repetitions for the TB 232 using different redundancy versions and/or the same redundancy versions. In some aspects, the UE 215 may include a RVN and/or a HARQ ID for each transmission, for example, in uplink control information (UCI) 260. For instance, the RVN may indicate a RV0, a RV1, a RV2, a RV3, a RV4, and so on. Each transmission for the TB A 230 may include UCI 260 indicating a HARQ ID HE Similarly, each transmission for the TB B 232 may include UCI 260 indicating a HARQ ID H2. The UE 215 may further indicate whether a transmission is an initial transmission or a retransmission by including a new data indicator (NDI) in the UCI 260. For example, the NDI may be set to a value of 1 to indicate that a corresponding transmission is an initial transmission and may be set to a value of 0 to indicate that a corresponding transmission is a retransmission. For instance, the UCI 260 for each transmission of the TB A 230 may include a NDI with a value of 1 to indicate that the repetitions of the TB A 230 are associated with an in initial transmissions of the TB A 230. The UCI 260 for each transmission of the TB B 232 may include a NDI with a value of 0 to indicate that the repetitions of the TB B 232 are associated with a retransmission of the TB B 232. In some aspects, the UE 215 may determine a RV sequence (e.g., a sequence of RVNs) for transmitting one or more redundancy versions of a TB in a configured resource and/or how to prioritize transmission of one TB of a certain HARQ process 222 over another TB of another HARQ process 222 without assistance from the BS 205. In some other instances, the BS 205 may provide the UE with some assistance in the RV sequence determination and/or HARQ ID selection. Mechanisms for determining RVNs and/or HARQ IDs for unscheduled transmission using configured resource 240 are described in greater detail below.

Figure 3:
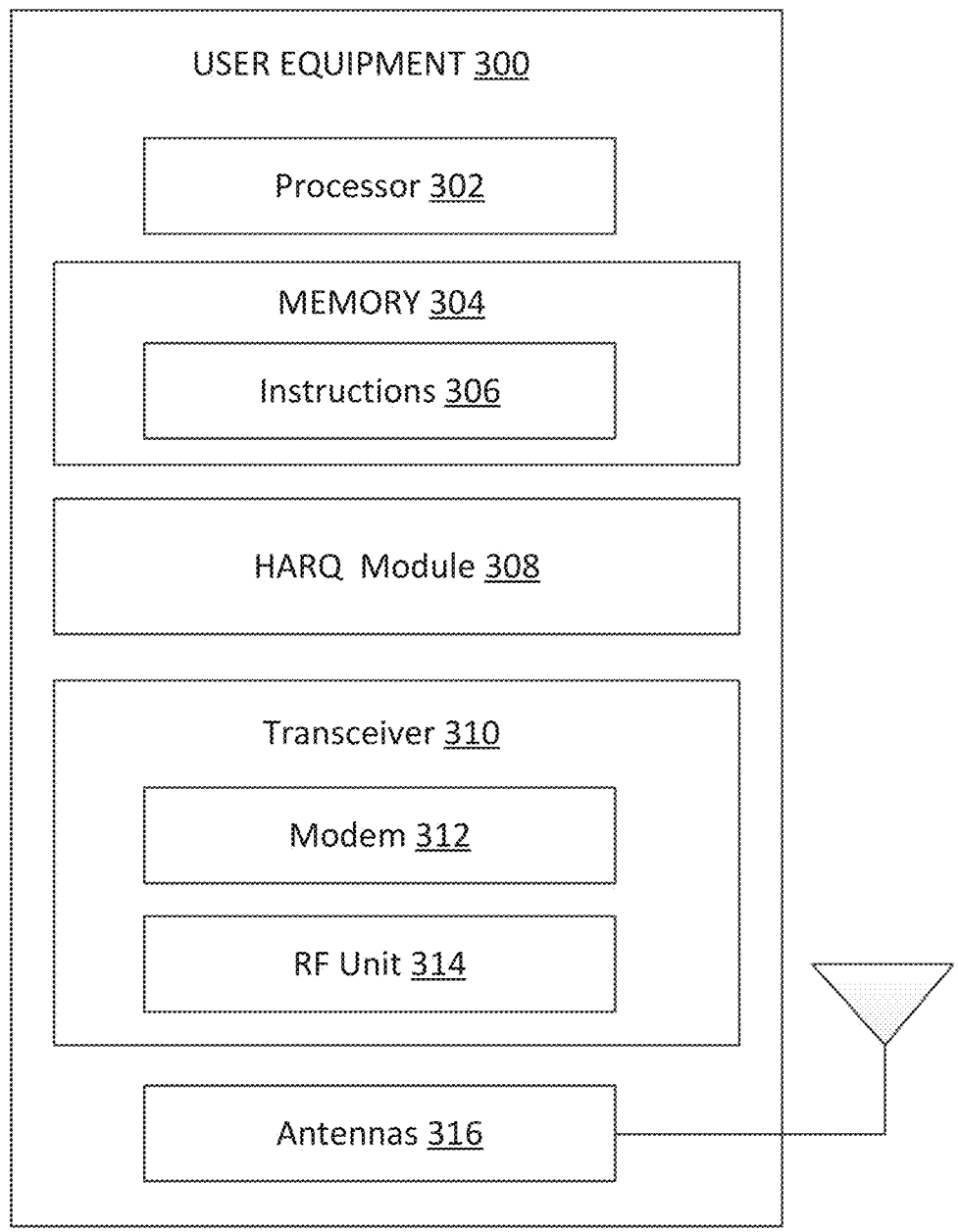
FIG. 3 is a block diagram of a user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a HARQ module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 2 and 5-17. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The HARQ module 308 may be implemented via hardware, software, or combinations thereof. For example, the HARQ module 308 may be implemented as a processor, circuit, and/or instructions 306 stored in the memory 304 and executed by the processor 302. In some instances, the HARQ module 308 can be integrated within the modem subsystem 312. For example, the HARQ module 308 can be implemented by a combination of software components (e.g., executed by a DSP or a general processor) and hardware components (e.g., logic gates and circuitry) within the modem subsystem 312.

The HARQ module 308 may be used for various aspects of the present disclosure, for example, aspects of FIGS. 2 and 5-17. The HARQ module 308 is configured to receive a configured grant from a BS (e.g., the BSs 105 and 205) indicating one or more configured resources, receive an indication of a plurality of RVNs from the BS, determine a RV sequence from the plurality or RVNs, map the RV sequence to transmission slots within a configured resource, perform LBT (e.g., based on channel energy detection), and transmit one or more redundancy versions of a TB associated with a HARQ process in one or more slots within the configured resource.

In some aspects, HARQ module 308 is configured to perform the RV mapping for successful transmissions. For instance, the HARQ module 308 may select a RVN from the RV sequence sequentially for each slot in the configured resource beginning at a slot where an initial transmission TB is successfully transmitted (e.g., after passing an LBT).

In some aspects, the HARQ module 308 is configured to perform the RV mapping beginning at a slot associated with an earliest LBT attempt irrespective of whether a transmission attempt is successful or not. For instance, the HARQ module 308 may select a RVN from the RV sequence sequentially for each slot in the configured resource beginning at a slot where a first transmission attempt is performed.

In some aspects, the HARQ module 308 is configured to receive, from the BS, a RV sequence including RVNs arranged in a certain order and determine a mapping between the configured RV sequence and transmission slots in the configured resource for unscheduled UL HARQ transmission with repetitions. In some aspects, the HARQ module 308 is configured to receive, from the BS, a mapping or association between the RV sequence and transmission slots in a configured resource and transmit UL HARQ transmission with repetitions in the configured resource according to the RV sequence and the RV-to-slot mapping.

In some aspects, the HARQ module 308 is configured to retransmit the TB in a subsequent configured resource. In some instances, the HARQ module 308 may reinitiate a RV mapping for the retransmission in the subsequent configured resource using the same mapping mechanisms as for the initial transmission. In some instances, the HARQ module 308 may resume from a last RVN in the RV sequence used in the initial transmission. In some instances, the HARQ module 308 may transmit one or more redundancy versions of the TB using any RVNs. In some aspects, the HARQ module 308 is configured to receive ACK/NACKs from the BS and determine the retransmission for the TB based on receiving a NACK or no ACK/NACK for a previous transmission of the TB.

In some aspects, the HARQ module 308 is configured to prioritize TBs of different HARQ processes for unscheduled transmission in a configured resource. In some instances, the HARQ module 308 may transmit TBs of different HARQ process in the order of MAC PDU preparation order. In some instances, the HARQ module 308 may prioritize a retransmission over an initial transmission. In some instances, the HARQ module 308 may prioritize the TBs of the different HARQ processes based on data priorities and/or latency requirements of the HARQ processes. Mechanisms for transmitting unscheduled UL data with HARQ using configured resources in a shared radio frequency band are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the HARQ module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., PUSCH data, UCI, UL HARQ data block) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., configured grants, configured RVNs, configured RVN order, RV sequences, configured RV-to-slot mapping, and/or HARQ ACK/ACK) to the HARQ module 308 for processing. The antennas 316 may include multiple antennas of similar or different designs in order to sustain multiple transmission links. The RF unit 314 may configure the antennas 316.

In an example, the transceiver 310 is configured to receive a configured grant, a RV sequence, and/or RVNs from a BS and transmit unscheduled HARQ UL data to the BS using configured resource indicate by the configured grant, for example, by coordinating with the HARQ module 308.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
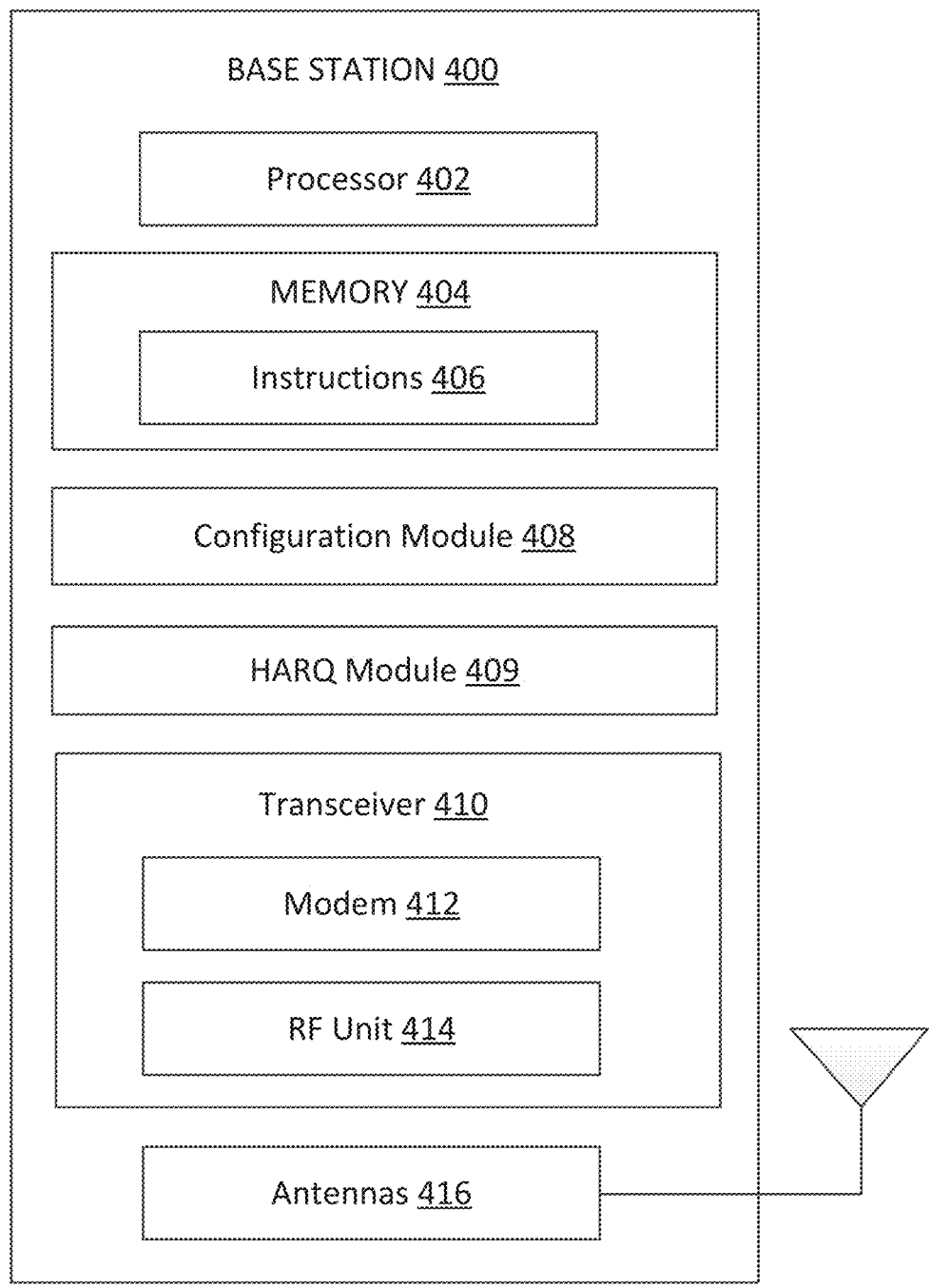
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. A shown, the BS 400 may include a processor 402, a memory 404, a configuration module 408, a HARQ module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2, 5-12. Instructions 406 may also be referred to as code, which may be interpreted broadly to include any type of computer-readable statement(s) as discussed above with respect to FIG. 3.

Each of the configuration module 408 and the HARQ module 409 may be implemented via hardware, software, or combinations thereof. For example, each of the configuration module 408 and the HARQ module 409 may be implemented as a processor, circuit, and/or instructions 406 stored in the memory 404 and executed by the processor 402. In some examples, the configuration module 408 and the HARQ module 409 can be integrated within the modem subsystem 412. For example, the configuration module 408 and the HARQ module 409 can be implemented by a combination of software components (e.g., executed by a DSP or a general processor) and hardware components (e.g., logic gates and circuitry) within the modem subsystem 412. In some examples, a UE may include one or both of the configuration module 408 and the HARQ module 409. In other examples, a UE may include all of the configuration module 408 and the HARQ module 409.

The configuration module 408 and the HARQ module 409 may be used for various aspects of the present disclosure, for example, aspects of FIGS. 2, 5-12. The configuration module 408 is configured to determine configured resources in a shared radio frequency band for a UE (e.g., the UE 115, 215, and/or 300), transmit a configured grant to the UE indicating the configured resources, transmit a configuration to the UE indicting a RV sequence, RVNs, a RV-to-slot mapping for the UE to transmit unscheduled HARQ UL transmission in the configured resources.

The HARQ module 409 may be used for various aspects of the present disclosure, for example, aspects of FIGS. 2, 5-12. The HARQ module 409 is configured to receive PUSCH from the UE, perform decoding on the PUSCH in the configured resource, transmit ACK/NACK to the UE based on the decoding results. Mechanisms for configuring a UE for unscheduled UL HARQ transmission using configured resources are described in greater detail herein.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., configured grant, RV sequences, RVNs, HARQ ACK/NACK) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., UL HARQ data, UCI, PUSCH) to the communication module 408 and HARQ module 409 for processing. The antennas 416 may include multiple antennas of similar or different designs in order to sustain multiple transmission links.

In an example, the transceiver 410 is configured to transmit a configured grant, a RV sequence, a set of RVNs, and/or HARQ ACK/NACKs to a UE and/or receive UL HARQ data blocks from the UE, for example, by coordinating with the configuration module 408 and the HARQ module 409.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

FIGS. 5-10 illustrate various mechanisms for a UE (e.g., the UEs 115, 215, and/or 300) to determine which RVNs to use when using configured resources (e.g., the configured resources 240) for unscheduled HARQ UL transmission. In FIGS. 5-10, the method 500 and the schemes 600, 700, 800, and/or 900 may be employed by a UE such as the UEs 115, 215, and/or 300 and a BS such as the BSs 105, 205, and/or 500 in a network such as the network 100. In particular, the BS may configure the UE with configured resources and RVNs, and the UE may determine RVN mapping based on the configured RVNs for transmitting unscheduled HARQ UL data in the configured resources as shown in the method 500 and schemes 600-1000. The method 500 is described in relation to the schemes 600-1000. For simplicity of discussion and illustration, the method 500 and the schemes 600-1000 are described using a RV cycle with a total of four transmissions (including three repetitions) for each TB transmission. However, the number of total transmissions in a RV cycle can be scaled to include any suitable number of repetitions (e.g., about 1, 2, 4, or 5 or more). Additionally, in FIGS. 6-10, the x-axes represent time in some arbitrary units. Further, the schemes 600-1000 are illustrated using the same configured resource structure and HARQ process arrangement as in FIG. 2, and may use the same reference numerals as in FIG. 2 for simplicity sake.

Figure 5:
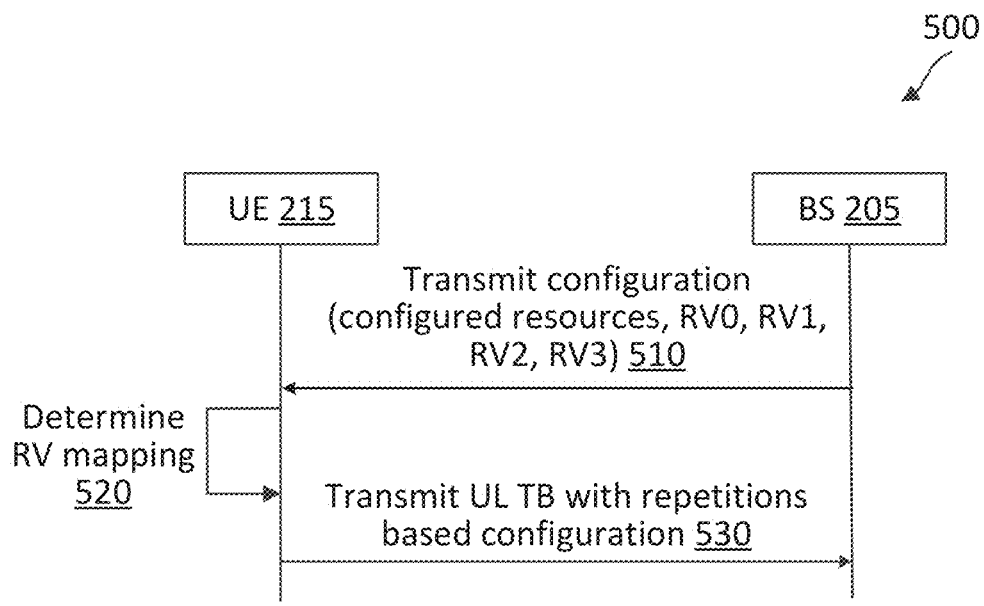
FIG. 5 is a signaling diagram illustrating a HARQ communication method using configured resources according to some aspects of the present disclosure.

FIG. 5 is a signaling diagram illustrating a HARQ communication method 500 using configured resources according to some aspects of the present disclosure. The method 500 is implemented between the BS 205 and the UE 215 of FIG. 2. As illustrated, the method 500 includes a number of enumerated steps, but embodiments of the method 500 may include additional steps before, after, and in between the enumerated steps. In some aspects, one or more of the enumerated steps may be omitted or performed in a different order.

At step 510, the BS 205 transmits a configured grant resource configuration to the UE 215. The configuration may indicate a set of configured resources in a shared radio frequency band. The configured resources may also be referred to as configured grant resources. The shared radio frequency band may correspond to the shared radio frequency band 202 of FIG. 2. The configured resources may correspond to the configured resource 240 with a certain periodicity (e.g., repeating at a time interval 242) shown in FIG. 2. The configuration may indicate a set of RVNs, for example, a version 0, a version 1, a version 2, and a version 3 shown as RV0, a RV1, a RV2, and a RV3, respectively, for unscheduled UL data (e.g., PUSCH data) transmissions with HARQ. In some aspects, the configuration may indicate a maximum number of repetitions configured for each TB transmission associated with a HARQ process (e.g., the HARQ processes 222 H1, H2 ..., Hn shown in FIG. 2). For instance, the configuration may indicate a maximum number of repetitions of 3 (or a total of 4 transmission) for the illustrated example where the set of RVNs includes RV0, a RV1, a RV2, and a RV3. In some aspects, the BS may allow the UE 215 to use a less number of repetitions than the maximum number of repetitions in a HARQ transmission. In some aspects, the configuration may further indicate a configured order for the set of RVNs. In some aspects, the configuration may further indicate a mapping or association between the set of RVNs and transmission slots in a configured resource.

At step 520, the UE 215 determines a RV mapping between the set of RVNs and transmission slots (e.g., the transmission slots 206) in the configured resource for HARQ transmissions. For instance, the UE 215 may determine a RV sequence from the set of RVNs and a mapping of the RV sequence to the transmission slots in a configured resource. When the configuration includes a configured order for the set of RVNs and/or a configured mapping for the set of RVNs to the transmission slots in the configured resources, the UE 215 may consider the configured order and/or the configured mapping during the RV mapping determination. The UE 215 may use various mechanisms to determine the RV mapping as described in greater detail below in FIGS. 6-10.

At step 530, the UE 215 transmits a UL TB with repetitions (e.g., about 1, 2, 3, 4, or 5 or more) in a configured resource. The UE 215 may transmit the repetitions using various RVNs based on the determine RV mapping.

The BS 205 may feedback a reception status to the UE 215. For instance, if the BS 205 successfully decodes the UL TB, the BS 205 may transmit a HARQ ACK to the UE 215. If the BS 205 fails to decode the UL TB, the BS 205 may transit a HARQ NACK to the UE 215. Subsequently, the UE 215 may determine whether to retransmit the TB based on the reception status. For instances, if the UE 215 receives an ACK from the BS 205, the UE 215 may transmit a new TB in next configured resource. If the UE 215 receives a NACK from the BS 205 or fails to receive an ACK/NACK from the BS 205, the UE 215 may retransmit the TB in a next configured resource.

Figure 6:
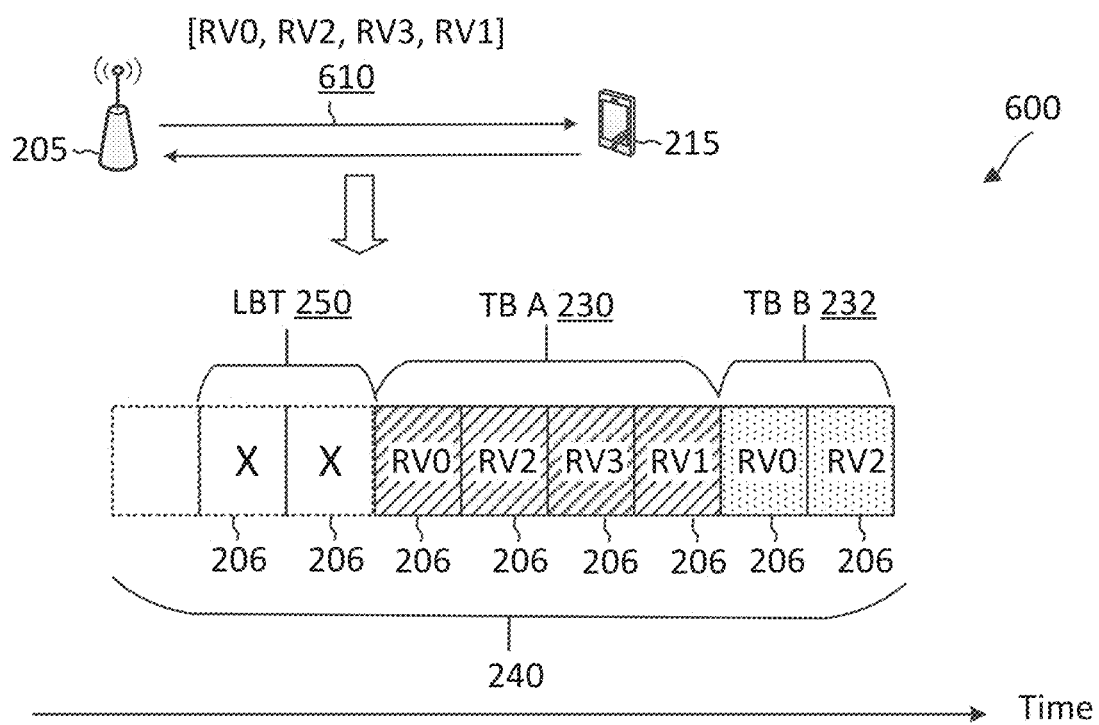
FIG. 6 illustrates a HARQ transmission scheme using configured resources according to some aspects of the present disclosure.

FIG. 6 illustrates a HARQ transmission scheme 600 using configured resources according to some aspects of the present disclosure. In the scheme 600, the BS 205 may configure the UE 215 with a set of RVNs with a configured order and the UE 215 may map the RVNs to successful transmissions according to the configured order. In this regard, the BS 205 transmits a configuration to the UE 215 indicating a set of RVNs 610 (e.g., RV0, RV1, RV2, and RV3) in a configured order. In the illustrated example of FIG. 6, the set of RVNs 610 in the configured order is shown as [RV0, RV2, RV1, and RV3]. The UE 215 may select a RVN from the set of RVNs 610 based on the configured order for each transmission slot 206 in the configured resource 240 beginning at a slot 206 with a successful LBT 250 attempt.

In the illustrated example of FIG. 6, the UE 215 performs a first transmission attempt in a second transmission slot 206 within the configured resource 240 by performing an LBT 250 prior to the second transmission slot 206. The LBT 250 for transmission in the second transmission slot 206 failed as shown by the cross symbol. The UE 215 may determine to perform a second transmission attempt in a next slot 206 (e.g., the third transmission slot 206) by performing an LBT 250 prior to the third transmission slot 206. Again, the LBT 250 for transmission in the third transmission slot 206 failed as shown by the cross symbol. The UE 215 may determine to perform another transmission attempt in a next slot 206 (e.g., the fourth transmission slot 206) by performing an LBT 250 prior to the fourth transmission slot 206. The LBT 250 for transmission in the fourth transmission slot 206 is successful, and thus the UE 215 proceeds with the transmission of the TB A 230.

In the scheme 600, the UE 215 may not consider a transmission slot 206 with a failed LBT attempt for RV mapping. The UE 215 determines a RV mapping for transmission in the configured resource 240 by selecting a RVN from the set of RVNs 610 based on the configured order for each transmission slot 206 beginning at the fourth slot 206 where the LBT 250 passes. The transmission slots 206 after the LBT 250 passes are mapped to RV0, RV2, RV3, and RV1 in order for the TB A 230 transmission. After determining the mapping, the UE 215 transmits the TB A 230 with a RVN corresponding to a RVN of a transmission slot 206 in which the TB is transmitted.

The UE 215 may determine a total number of transmission for the TB A 230 in a RV cycle based on a total number of RVNs (e.g., 4) in the set of RVNs. As shown, the UE 215 uses RV0 for a first successful transmission of the TB A 230 and uses RV2, RV3, and RV1 for subsequent repetitions of TB A 230 based on the determined mapping. After completing the transmission for the TB A 230 including the repetitions, the UE 215 may transmit another TB with repetition in remaining slots 206 of the configured resource 240 by restarting the RV mapping (e.g., starting at a beginning of the RV sequence). As shown, the UE 215 transmits a TB B 232 using RV0 and a repetition of the TB B 232 using RV2 in the remaining slots 206.

Figure 7:
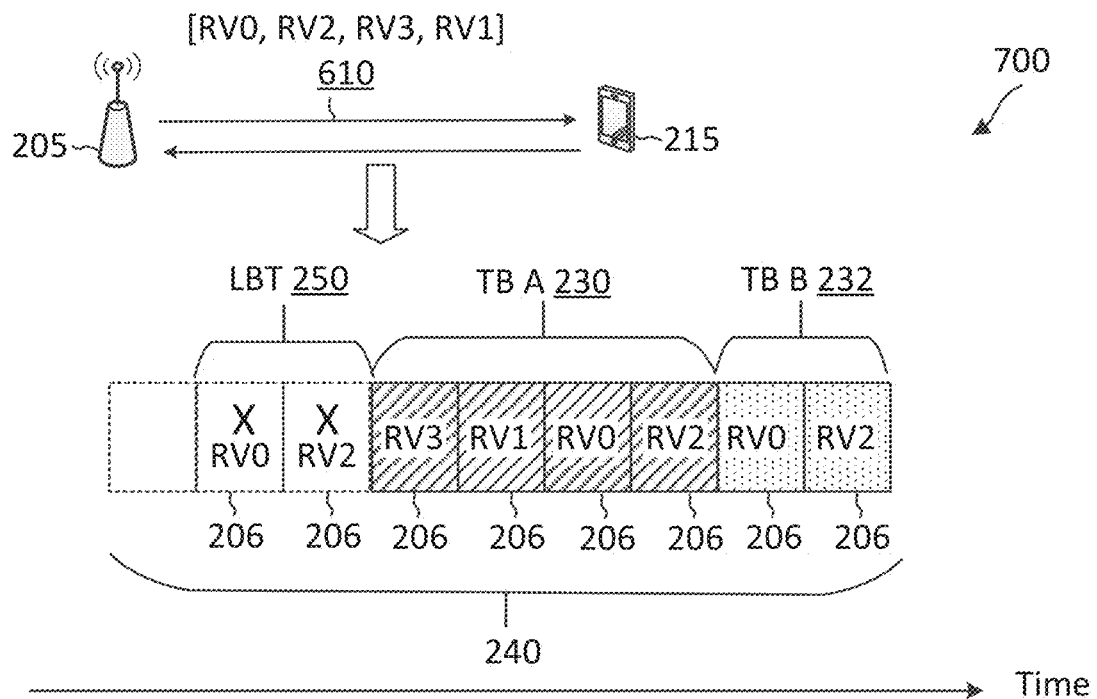
FIG. 7 illustrates a HARQ transmission scheme using configured resources according to some aspects of the present disclosure.

FIG. 7 illustrates a HARQ transmission scheme 700 using configured resources according to some aspects of the present disclosure. The scheme 700 is described using the same LBT scenario as in FIG. 6. The scheme 700 is substantially similar to the scheme 600, where the BS 205 may configure the UE 215 with a set of RVNs 610 (e.g., RV0, RV1, RV2, and RV3) in a configured order, [RV0, RV2, RV1, and RV3]. However, in the scheme 700, the UE 215 may map the set of RVNs 610 to transmission attempts instead of successful transmissions as in the scheme 600. In this regard, the UE 215 may begin the mapping at a transmission slot 206 where a first transmission attempt for a TB is performed irrespective of whether a correspond LBT attempt is successful or not. For instance, the UE 215 may select a RVN from the set of RVNs 610 based on the configured order for each transmission slot 206 in the configured resource 240 beginning at a slot 206 associated with an earliest LBT 250 attempt. Thus, the RV mapping may be applied to transmission slots 206 where LBT fails and transmission slots 206 where actual transmissions are performed.

In the illustrated example of FIG. 7, the UE 215 begins a LBT 250 for a first attempt in transmitting the TB A 230 in the second transmission slot 206 of the configured resource. The UE 215 fails the LBT 250 in the second transmission slot 206 and again in a subsequent third transmission slot 206. The UE 215 determines a RV mapping for transmission in the configured resource 240 by selecting a RVN from the set of RVNs 610 based on the configured order for each transmission slot 206 beginning at the second slot 206 where a first transmission attempt is performed. The UE 215 may repeat one or more of the RVNs in the set of RVNs 610 based on the configured order after using up all the RVNs in the set of RVNs 610. In other words, the UE 215 may cyclically wrap the RV sequence formed by the set of RVNs 610 in the configured order for the mapping. The UE 215 may determine a total number of transmissions for TB A 230 based on the length of the set of the RVNs 610.

As shown, the transmission slots 206 after the start of the LBT 250 are mapped to RV0, RV2, RV3, RV1, RV0, and RV2 in order until all the transmissions/repetitions for the TB A 230 are mapped. After determining the mapping, the UE 215 transmits the TB A 230 with a RVN corresponding to a RVN of a transmission slot 206 in which the transmission is performed. The UE 215 uses RV3 for a first successful transmission of the TB A 230 and uses RV1, RV0, and RV2 for subsequent repetitions of TB A 230 based on RVNs of the corresponding transmission slots 206 in which the transmissions are performed. After completing the transmissions for the TB A 230 including all the repetitions, the UE 215 transmits another TB (e.g., the TB B 230) with repetition in remaining slots 206 of the configured resource 240 by restarting the RV mapping. As shown, the UE 215 transmits a TB B 232 using RV0 and a repetition of the TB B 232 using RV2 in the remaining slots 206.

Figure 8:
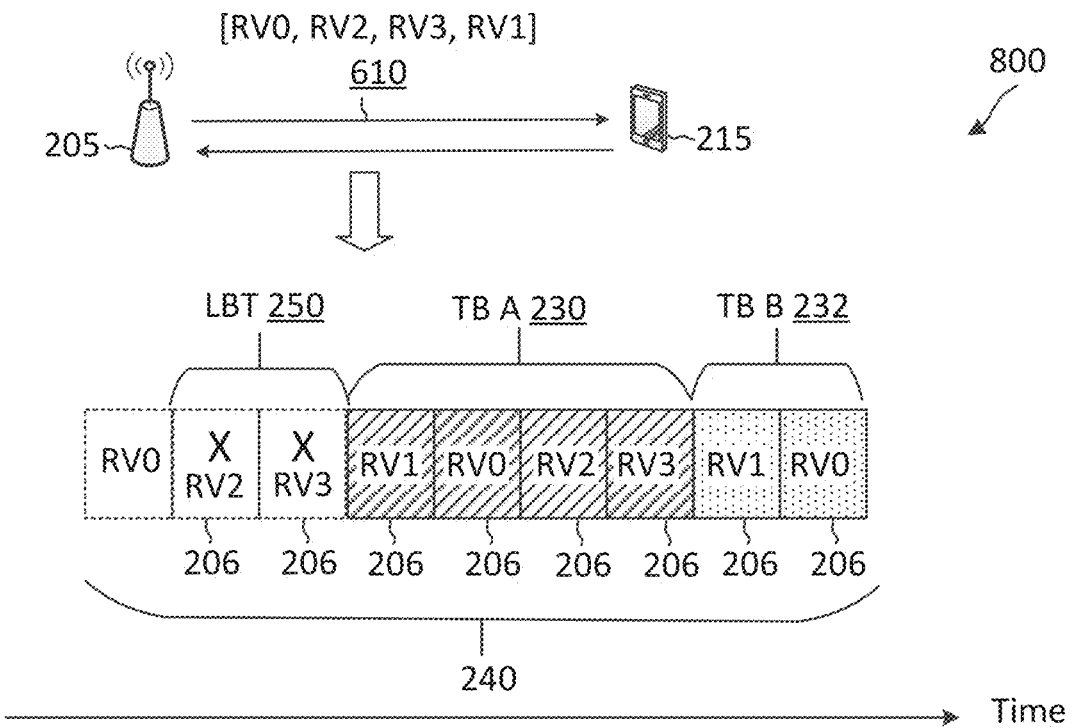
FIG. 8 illustrates a HARQ transmission scheme using configured resources according to some aspects of the present disclosure.

FIG. 8 illustrates a HARQ transmission scheme 800 using configured resources according to some aspects of the present disclosure. The scheme 800 is described using the same LBT scenario as in FIG. 6. In the scheme 800, the BS 205 may configure the UE 215 with a set of RVNs 610 (e.g., RV0, RV1, RV2, and RV3) in a configured order, [RV0, RV2, RV1, and RV3], similar to the scheme 600. However, the BS 205 additionally configure the UE 215 with a mapping or association between the set of RVNs 610 and transmission slots 206 in the configured resource 240. As shown, the set of RVNs 610 is mapped to the transmission slots 206 in the configured order and the set of RVNs 610 is cyclically wrapped for the mapping until all transmission slots 206 are mapped.

The UE 215 may perform an LBT 250 prior to transmitting the TB A 230. Upon passing the LBT 250, the UE 215 transmits the TB A 230 with a RVN corresponding to a RVN of a transmission slot 206 in which the transmission is performed. The UE 215 may determine the total number of transmissions for the TB A 230 based on a configuration provided by the BS 205. As shown, The UE 215 uses RV1 for a first successful transmission of the TB A 230 and RV0, RV2, and RV3 for subsequent repetitions of TB A 230 based on RVNs of the corresponding transmission slots 206 in which the repetitions are transmitted. After completing the transmissions for the TB A 230 including all the repetitions, the UE 215 transmits the TB B 232 with repetition in remaining slots 206 of the configured resource 240. The UE 215 uses RV1 for a first transmission of the TB B 232 and RV0 for a subsequent repetition of TB B 230 based on RVNs of the corresponding transmission slots 206 in which the transmissions are performed.

The scheme 800 does not require repetitions of a TB to align with a RV cycle. In the illustrated example, the RV cycle includes RV0, RV2, RV3, and RV1 in the configured order according to the set of RVNs 610. The UE 215 starts the transmission of the TB A 230 at RV1, which is not a starting RVN in the RV cycle, and the UE 215 completes the repetitions at RV3, which is not a last RVN in the RV cycle. Thus, while the scheme 800 restrict the mapping between the set of RVNs 610 and transmission slots 206 in configured resources, the scheme 800 allows the UE 215 with the flexibility to start a TB transmission and/or ends a repetition of the TB without aligning to the RV cycle as configured by the set of RVNs 610.

Figure 9:
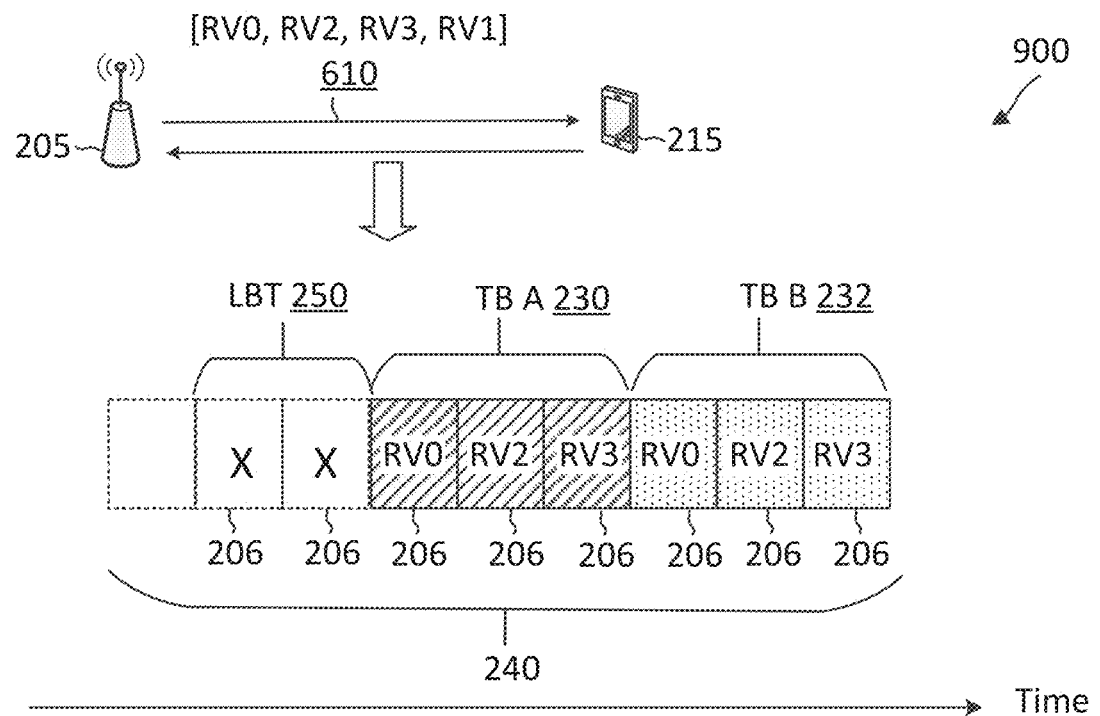
FIG. 9 illustrates a HARQ transmission scheme using configured resources according to some aspects of the present disclosure.

FIG. 9 illustrates a HARQ transmission scheme 900 using configured resources according to some aspects of the present disclosure. The scheme 900 is substantially similar to the scheme 600, where the BS 205 may configure the UE 215 with a set of RVNs 610 in a configured order. However, the scheme 900 allows the UE 215 to perform a less number of repetitions than a configured number of repetitions for a TB transmission. In this regard, the UE 215 may determine a number of repetitions for a TB transmission based on a number of transmission slots 206 available in a configured resource 240 after passing an LBT. The UE 215 may split the number of available transmission slots 206 in a configured resource 240 among multiple TB transmissions to allow each TB transmission (e.g., the TB A 230 of the HARQ process H1 and the TB B 232 of the HARQ process H2) with about similar number of repetitions. The scheme 900 may be used in conjunction with the schemes 600-800 to improve transmission delays.

For instance, in the example illustrated in FIG. 6, the UE 215 transmits the TB A 230 with 3 repetitions and the TB B 232 with 1 repetition. To provide a good or acceptable decoding performance, the UE 215 may be required to transmit additional repetitions of the TB B 232. While the UE 215 may transmit additional repetitions in another configured resource 240, there is a time gap between the repetitions of the TB B 232, for example, depending on the periodicity of the configured resource 240. Additionally, the UE 215 may be required to perform another LBT to gain channel access in the next configured resource 240. As such, there may be a long delay for the transmission of the TB B 232 to complete. The long delay may not be desirable or acceptable, especially delay sensitive traffic such as URLLC type traffic.

Accordingly, the scheme 900 provides the UE 215 with the flexibility to determine a number of repetitions for a TB transmission. In the illustrated example of FIG. 9, the UE 215 reduces the number of repetitions for the TB A 230 to two so that the TB B 232 may be transmitted with two repetitions within the configured resource 240. As shown, the UE 215 uses RV0 for a first successful transmission of the TB A 230 and uses RV2 and RV3 for two repetitions of the TB A 230. Subsequently, the UE 215 uses RV0 for a first transmission of the TB B 232 and uses RV2 and RV3 for two repetitions of the TB B 232. By transmitting each of the TB A 230 and TB B 232 with two repetitions, the decoding performance may be sufficient for both the TB A 230 and TB B 232. As such, the UE 215 may avoid transmitting the TB B 232 with a long delay gap between repetitions of the TB B 232.

As discussed above in FIG. 2, each HARQ TB transmission may include a UCI message (e.g., UCI 260) indicating a HARQ ID, a RVN, and/or a NDI for the TB transmission. As such, the BS 205 may detect the start of the TB B 232 transmission in the seventh slot 206 within the configured resource 240 based on the UCI carried in the corresponding TB B 232 transmission.

Figure 10:
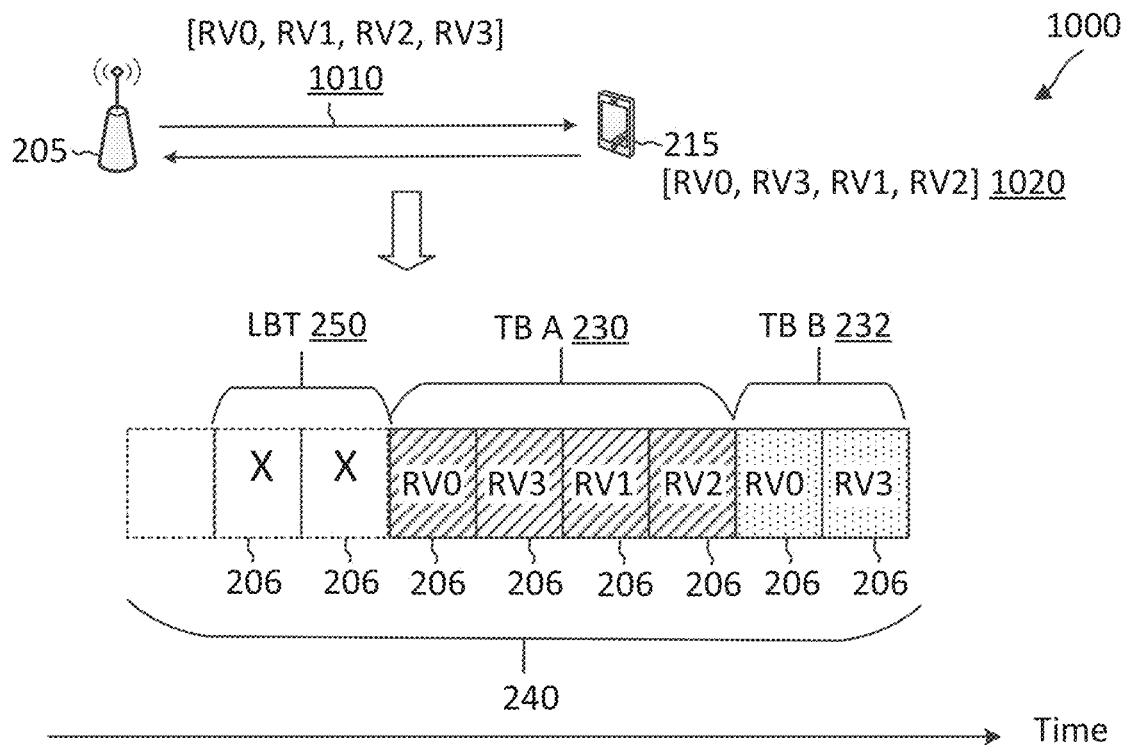
FIG. 10 illustrates a HARQ transmission scheme using configured resources according to some aspects of the present disclosure.

FIG. 10 illustrates a HARQ transmission scheme 1000 using configured resources according to some aspects of the present disclosure. The scheme 1000 is described using the same LBT scenario as the scheme 600. In the scheme 1000, the BS 205 may configure the UE 215 with a set of RVNs 1010 shown as [RV0, RV1, RV2, and RV3], but without a specific order. The UE 215 may determine any RV mapping order using the set of RVNs 1010. In some instances, the UE 215 may determine a RV sequence for the mapping using one or more RVNs in the set of RVNs 1010. In some instances, the UE 215 may determine a RV sequence for the mapping using all RVNs in the set of RVNs 1010. In some instances, the UE 215 may determine a RV sequence for the mapping by repeating one or more of the RVNs in the set of RVNs 610. In some instances, the UE 215 may determine any suitable number of repetitions for a TB transmission using the RVNs in the set of RVNs 1010. For instance, the UE 215 may determine a RV sequence with a length of 5 for each TB transmission using the RVNs from the set of RVNs 1010. In some other instances, the UE 215 may determine a RV sequence with a length of 3 for each transmission using the RVNs from the set of RVNs 1010.

In the illustrated example of FIG. 10, the UE 215 determines a RV sequence 1020 from the set of RVNs 1010 in the order of RV0, RV3, RV1, and RV2. The UE 215 may use the same RV mapping mechanism as in the scheme 600 where the mapping is performed for successful transmissions. As shown, the UE 215 uses RV0 for a first successful transmission of the TB A 230 and uses RV2, RV3, and RV1 for subsequent repetitions of TB A 230 based on the determined mapping with the determined RV sequence 1020. After completing the transmission for the TB A 230 including the repetitions, the UE 215 may transmit another TB with repetition in remaining slots 206 of the configured resource 240 by restarting the RV mapping (e.g., starting at a beginning of the RV sequence 1020). As shown, the UE 215 transmits a TB B 232 using RV0 and a repetition of the TB B 232 using RV3 in the remaining slots 206.

While FIG. 10 is illustrated using the mapping mechanisms of the scheme 600, the scheme 1000 may be used with the mapping mechanisms discussed in the scheme 700 with respect to FIG. 7. For instance, the UE 215 may determine the order or the RV sequence 1020 based on a set of configured RVNs (e.g., the set of RVNs 1010 received from the BS 205) and perform the RV mapping based on transmission attempts to include transmission slots 206 where corresponding LBT attempt failed. Additionally, the scheme 1000 may be applied in conjunction with the scheme 900 discussed above with respect to FIG. 9, where the UE 215 may adjust the number of repetitions for a TB transmission based on a number of transmission slots 206 available for transmission in a configured resource after passing an LBT.

As discussed above in FIG. 2, a UCI message (e.g., the UCI 260) may be included in a HARQ transmission to indicate whether the TB in the transmission is a new transmission or a retransmission. Additionally, the UCI message may include a RVN to indicate a RVN used for generating the TB transmission. For instance, the transmission of a TB (e.g., the TBs 230 and/or 232) with a redundancy version of RV0 may include, in the UCI, a RVN message field indicating RV0 (e.g., RVN=0). Similarly, the transmission of a TB with a redundancy version of RV1 may include, in the UCI, a RVN message field indicating RV1 (e.g., RVN=1), and so on. In some aspects, the bit-width of RVN message field may be dependent on the set of RVNs (e.g., the set of RVNs 610 and/or 1010). For instance, if the set of RVNs include RV0 to RV3, the RVN message field may include a length of about 2 bits to represent the values 0 to 4. Alternatively, if the set of RVNs include RV0 to RV4, the RVN message field may include a length of about 3 bits to represent the values 0 to 4. Accordingly, a BS (e.g., the BSs 105, 205, and/or 400) and/or a UE (e.g., the UEs 115, 215, and/or 300) may determine a bit-width for the RVN message field in a UCI message based on the set of configured RVNs.

In some aspects, a UE (e.g., the UEs 115, 215, and/or 300) may use any suitable combinations of the schemes 600-1000 for transmitting unscheduled HARQ UL data in configured resources. For instance, in some instances, the UE may employ any of the scheme 600, 700, 800, or 1000 in conjunction with the scheme 900. In some other instances, the UE may employ the scheme 1000 to determine a RV sequence and maps the RV sequence to successful transmission only or including failed transmission attempts as discussed in the scheme 600 or 700, respectively.

In some aspects, a UE (e.g., the UEs 115, 215, and/or 300) may select any suitable RVNs to form a RV sequence and may map the RV sequence to transmission slots (e.g., the slots 202) in a configured resource (e.g., the configured resource 240) using the schemes 600, 700, 800, 900, and/or 1000 discussed above for transmitting unscheduled HARQ UL data in the configured resource.

In some aspects, a UE (e.g., the UEs 115, 215, and/or 300) may prepare a PUSCH transmission (e.g., including UL data) in advance of a determined transmission time. The preparation may include performing data scrambling, encoding, and/or modulation on a media access control (MAC) packet data unit (PDU). For instance, the UE may perform the preparation at a physical layer processing component, such as the transceiver 310 and/or the modem 312. Different UEs may have different capabilities, for example, different processing delays, and thus may require different amounts of time to prepare for PUSCH for transmission. For instance, one UE may require 1-slot time (e.g., the slot 206) to prepare for a PUSCH transmission while another UE may require 2-slot time to prepare for a PUSCH transmission. As such, RV mappings that are dependent on a successful LBT (e.g., the scheme 600) may impose a certain constrain on UE's processing capabilities.

Figure 11:
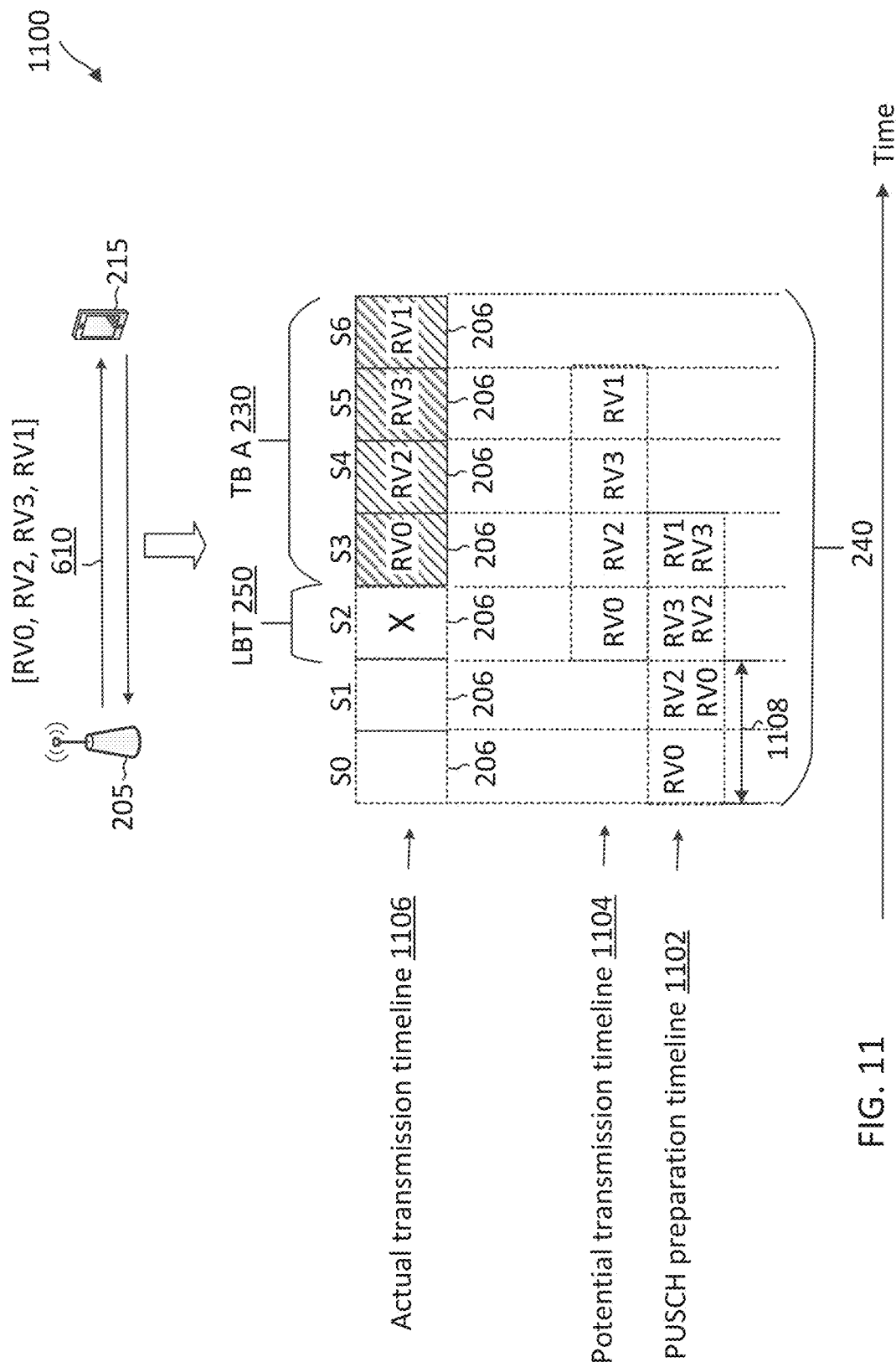
FIG. 11 illustrates a HARQ transmission scenario using configured resources according to some aspects of the present disclosure.

FIG. 11 illustrates a HARQ transmission scenario 1100 according to some aspects of the present disclosure. The scenario 1100 may correspond to a HARQ transmission scenario in the network 100 when the UE 215 uses the scheme 600 for RV mapping and requires 2-slot time 1108 to prepare a PUSCH for transmission, for example, including data encoding and modulation. In FIG. 11, the x-axis represents time in some arbitrary units and the transmission slots 206 in the configured resource 240 are labeled as S0 to S6. In the scenario 1100, the UE 215 may prepare at least two PUSCH transmissions before initiating a transmission attempt for the TB A 230 based on the 2-slot preparation timing requirement.

The UE 215 may prepare PUSCH transmission as shown in the timeline 1102 to meet a potential transmission timeline 1104. The order of the RVs in the timelines 1102 and 1104 is based on the configured set of RVNs 610. As shown, the UE 215 prepares a PUSCH for TB A 230 with a redundancy version of RV0 during the slots S0 and S1 206 for transmission in slot S2 206. The UE 215 prepares a PUSCH for TB A 230 with a redundancy version of RV2 during the slots S1 and S2 206 for transmission in slot S3 206. The UE 215 may have the first two transmissions RV0 and RV2 prepared before initiating the first transmission attempt for the slot S2 206.

The LBT 250 for the transmission attempt in the slot S2 206 shown by the cross symbol. The UE 215 may perform another LBT for a transmission attempt in the slot 206 and the LBT is a success. Thus, instead of transmitting the TB A 230 as in the transmission timeline 1104, the UE 215 transmits the TB A 230 as shown in transmission timeline 1106. However, the UE 215 may have proceeded to prepare a transmission for the TB A 230 with a redundancy version of RV3 during the slot S2 206 as shown by the timeline 1102. In other words, the UE 215 may have the TB A 230 with redundancy versions of RV2 in the transmission pipeline in the slot S2 206. Since the UE 215 requires 2-slot time for PUSCH transmission preparation, the UE 215 may not have sufficient time to prepare a transmission for the PUSCH corresponding to TB A 230 with RV0 again in the slot S2 206 for transmission in the slot S3 206. As such, the configured RV order [RV0, RV2, RV3, RV1] may not be supported by a UE requiring 2 more slot timing for PUSCH transmission preparation.

Accordingly, a BS (e.g., the BSs 105, 205, and/or 400) may configure a RV sequence for a UE (e.g., the UEs 115, 215, and/or 300) according to the UE's capability. In some aspects, the BS may configure a RV sequence with no repeating RVN at the beginning of the sequence (e.g., [RV0, RV2, RV3, and RV1]) for a UE with a PUSCH preparation timing requirement of one slot (e.g., the slots 206) or less. For a UE with a PUSCH preparation timing requirement of N (e.g., N>1) slots or more, the BS may configure the UE with a RV sequence that has N number of repeating RVNs at the beginning of the RV sequence. For instance, for a UE with a 2-slot PUSCH preparation timing requirement, the BS may configure the UE with a RV sequence with 2 repeating RVNs at the beginning of the sequence (e.g., [RV0, RV0, RV3, and RV1]). For a UE with a 3-slot PUSCH preparation timing requirement, the BS may configure the UE with a RV sequence with 3 repeating RVNs at the beginning of the sequence (e.g., [RV0, RV0, RV0, RV1]). In some aspects, the BS may configure a UE with a PUSCH preparation timing requirement of two slots or more to use the scheme 700 instead of the scheme 600 for RV mapping.

In some aspects, a BS (e.g., the BSs 105, 205, and/or 400) may configure a RV sequence for a UE (e.g., the UEs 115, 215, and/or 300) with any RVNs and/or any order and the UE may determine whether to use the scheme 600 or 700 based on the UE's capability. For instance, if the UE is configured with a RV sequence MV0, RV2, RV3, RV11 and the UE is capable of preparing a PUSCH transmission in less than one slot, the UE may select the scheme 600 for RV mapping. If the UE is configured with a RV sequence [RV0, RV2, RV3, RV1] and the UE requires two or more slots to prepare for a PUSCH transmission, the UE may select the scheme 700 for RV mapping.

Thus, while the BS may have a better control on RV usage when the UE employs the scheme 600, the processing timing requirement at the UE may be more restrictive.

Figure 12:
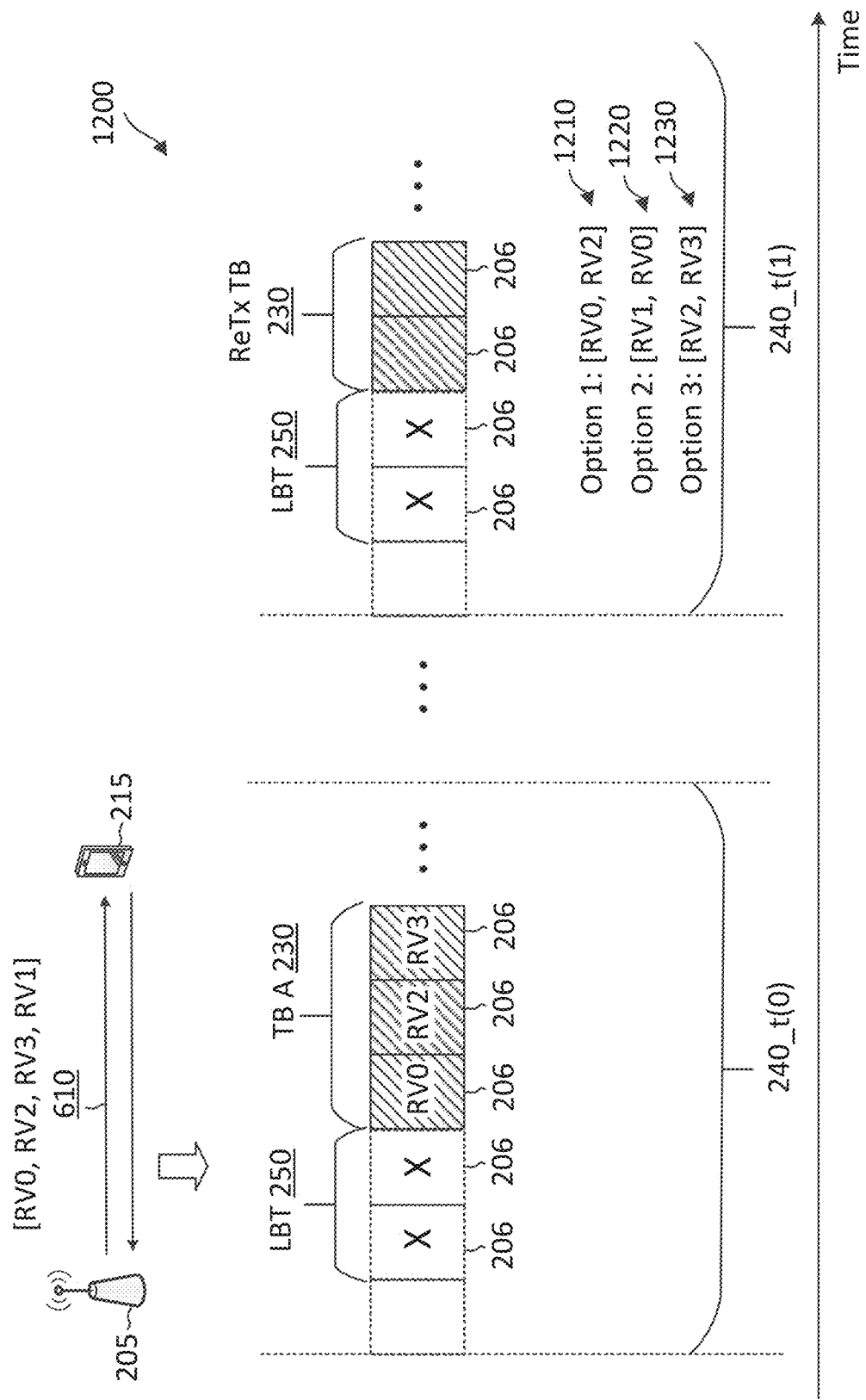
FIG. 12 illustrates a HARQ retransmission scheme using configured resources according to some aspects of the present disclosure.

FIG. 12 illustrates a HARQ retransmission scheme 1200 using configured resources according to some aspects of the present disclosure. The scheme 1200 may be employed by a UE such as the UEs 115, 215, and/or 300 and a BS such as the BSs 105, 205, and/or 400 in a network such as the network 100. In particular, the UE may perform unscheduled HARQ retransmissions using configured resources as shown in the scheme 1200. In FIG. 12, the x-axes represent time in some arbitrary units. The scheme 1200 is described using the same configured resource structure and HARQ process arrangement as in FIG. 2, and may use the same reference numerals as in FIG. 2 for simplicity sake. Additionally, the scheme 1300 is illustrated using the mapping mechanisms in the scheme 600 for a set of initial TB transmissions As shown, the BS 205 configures the UE 215 with a set of RVNs 610 (e.g., RV0, RV1, RV2, and RV3) in a configured order, [RV0, RV2, RV1, and RV3]. The UE 215 transmits the TB A 230 with redundancy versions RV0, RV2, and RV3 in a configured resource 240 shown as 240_*t*(0). The BS 205 may fail to decode the TB A 230 successfully and thus may transmit a NACK to the UE 215. Alternatively, the BS 205 may not detect the TB A 230 in the configured resource 240_*t*(0). Thus, the UE 215 may retransmit the TB A 230 in another configured resource 240 shown as 240_*t*(1). The retransmission may be triggered by a retransmission timer expiration for the HARQ process H1 of the TB A 230.

The UE 215 may perform LBT 250 prior to transmitting in the configured resource 240_*t*(1). Upon passing the LBT 250, the UE 215 may retransmit the TB A 230. In some aspects, the UE 215 may select a first option 1210 for the retransmission. In the first option 1210, the UE 215 performs the retransmission using the same procedure for RV mapping as in the initial transmission (in the configured resource 240_*t*(0)). As shown, the UE 215 retransmits the TB A 230 using RV0 and RV2 according to the configured order in the set of RVNs 610.

In some aspects, the UE 215 may select a second option 1220 for the retransmission. In the second option 1220, the UE 215 performs the retransmission by continuing from a last RVN used in the in the initial transmission (in the configured resource 240_*t*(0)). As shown, RV0, RV2, and RV3 were used in the configured resource 240_*t*(0). Thus, the UE 215 retransmits the TB A 230 using RV1 (after RV3 in the set of RVNs 610) in the configured resource 240_*t*(1). After using the last RVN (e.g., RV1) in the RV cycle, the UE 215 may cyclically wrap the set of RVNs 610 and use RV0 for a next repetition of the TB A 230 in the configured resource 240_*t*(1).

In some aspects, the UE 215 may select a third option 1230 for the retransmission. In the third option 1230, the UE 215 performs the retransmission by selecting any RVNs. In some instances, the UE 215 may select RVNs from the set of RVNs 610 in any order. As an example, the UE 215 retransmits the TB A 230 using RV2 and RV3.

In some aspects, a NR-U network (e.g., the network 100) may support multiple services with different quality-of-service (QoS) requirements. For instance, the network may support URLLC services where low latency is important. Thus, a UE (e.g., UEs 115, 215, and/or 300) may perform HARQ process selection for transmission with consideration for traffic requirements.

FIGS. 13-15 illustrate various mechanisms for a UE (e.g., the UEs 115, 215, and/or 300) to perform HARQ process selection for unscheduled HARQ transmission using configured resources. In FIGS. 13-15, the schemes 1300, 1400, and 1500 may be employed by a UE such as the UEs 115, 215, and/or 300 and a BS such as the BSs 105, 205, and/or 400 in a network such as the network 100. In particular, the UE may prioritize transmission or determine transmission priorities for HARQ processes (e.g., the HARQ processes 222 H1, H2, . . . , Hn) as shown in the schemes 1300-1500. The schemes 1300-1500 are illustrated using the same HARQ process arrangement as in FIG. 2, and may use the same reference numerals as in FIG. 2 for simplicity sake. For simplicity of discussion and illustration, FIGS. 13-15 illustrates two HARQ processes, H1 and H2, though similar HARQ process selection mechanisms may be applied to more than two HARQ processes. Additionally, the scheme 1300-1500 may consider HARQ processes with pending data, but without an ongoing retransmission, during a HARQ process selection.

FIG. 13 illustrates a HARQ transmission scheme 1300 using configured resources according to some aspects of the present disclosure. For example, the UE 215 may have one or more TBs ready for transmission in the HARQ process H1 222 and the HARQ process H2 222. The UE 215 further includes a HARQ selection module 1310, which may be implemented using hardware and/or software. The HARQ selection module 1310 is configured to select a HARQ process 222 for transmission according to a MAC PDU preparation order. For instance, the UE 215 prepares a TB from the HARQ process H1 222 (shown as TB(H1)) followed by preparing HARQ process H2 222 (shown as TB(H2)). Thus, the HARQ selection module 1310 may select TB(H1) for transmission before TB(H2). As shown, the UE 215 transmits TB(H1) at time T(0) followed by TB(H2) at time T(1).

FIG. 14 illustrates a HARQ transmission scheme 1400 using configured resources according to some aspects of the present disclosure. For example, the UE 215 may have one or more TBs ready for transmission in the HARQ process H1 222 and the HARQ process H2 222. The UE 215 further includes a HARQ selection module 1410, which may be implemented using hardware and/or software. The HARQ selection module 1410 is configured to prioritize a retransmission over an initial transmission. For instance, the HARQ process H1 222 has a new TB ready for an initial retransmission (shown as TB(H1, newTx)) and the HARQ process H2 222 has a TB ready for retransmission (shown as TB(H2, ReTx)). Thus, the HARQ selection module 1410 may prioritize TB(H2, ReTx) over TB(H1, newTx) for transmission. As shown, the UE 215 transmits TB(H2, ReTx) at time T(0) followed by TB(H1, newTx) at time T(1).

FIG. 15 illustrates a HARQ transmission scheme 1500 using configured resources according to some aspects of the present disclosure. For example, the UE 215 may have one or more TBs ready for transmission in the HARQ process H1 222 and the HARQ process H2 222. The UE 215 further includes a HARQ selection module 1510, which may be implemented using hardware and/or software. The HARQ selection module 1510 is configured to prioritize a HARQ process 222 with a high data priority over a HARQ process 222 with a lower data priority. For instance, the HARQ process 222 H1 has a data priority P2 and the HARQ process H2 222 has a data priority P1 higher than the priority P2. Thus, the HARQ selection module 1510 may prioritize TB(H2, P1) over TB(H1, P2). As shown, the UE 215 transmits TB(H2, P1) at time T(0) followed by TB(H1, P2) at time T(1).

In some aspects, a UE (e.g., the UE 115, 215, and/or 300) may use a combination of the schemes 1300, 1400, and 1500 for prioritizing transmissions from different HARQ processes. For instance, the UE may prioritize HARQ retransmissions over new TB transmissions and prioritize transmissions within HARQ retransmission. For instance, the UE may prioritize a TB with the highest data priority scheduled for retransmissions over a TB with a lower data priority scheduled for retransmissions. In some other instances, the UE may give highest priority to a highest-priority transmission and then may prioritize a retransmission over a new retransmission among the remaining scheduled transmissions. In some aspects, each HARQ process may be represented by a HARQ ID, each HARQ ID may be associated with a data priority, and each TB may be associated or tagged with a HARQ ID. Thus, in some instances, the UE may determine a data priority for a TB based on a corresponding HARQ ID.

In some aspects, a BS (e.g., the BSs 105, 205, and/or 400) may communicate UL HARQ transmissions with a UE (e.g., the UEs 115, 215, and/or 300) using any suitable combination of the schemes 200, 600, 700, 800, 900, 1000, 1200, 1300, 1400, and/or 1500 described above with respect to FIGS. 2, 6, 7, 8, 9, 10, 12, 13, 14, and/or 15, respectively.

Figure 16:
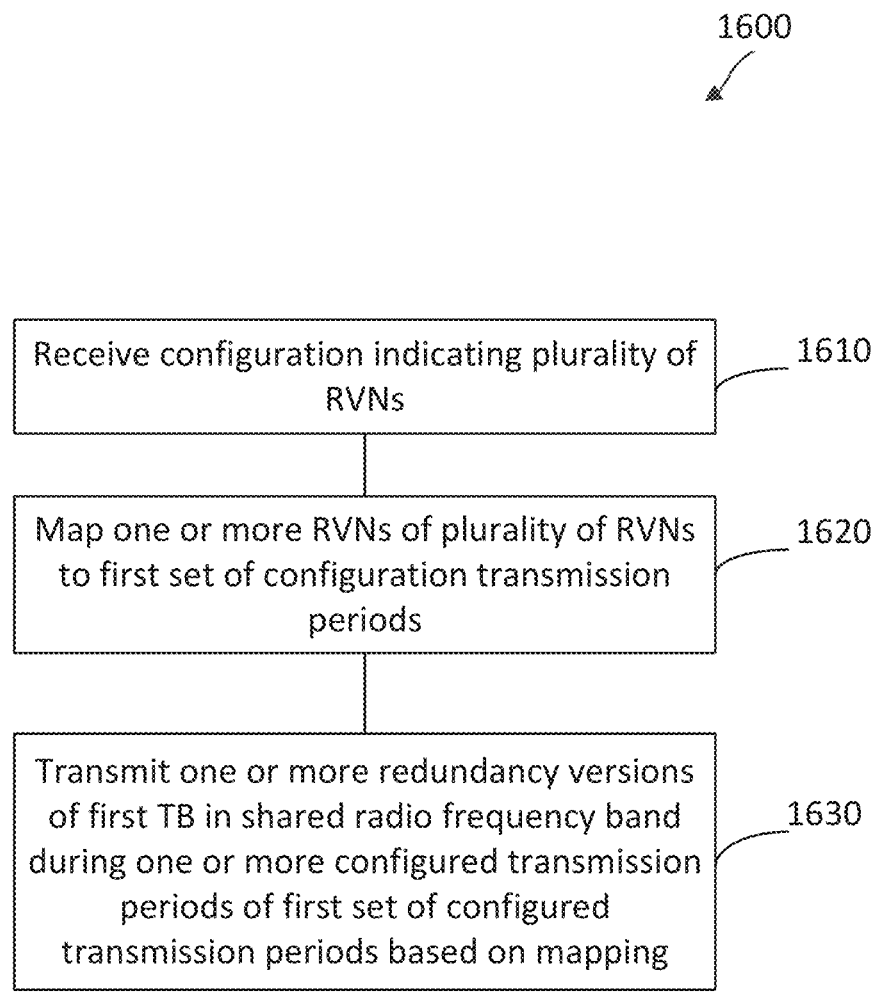
FIG. 16 is a flow diagram of a communication method according to some aspects of the present disclosure.

FIG. 16 is a flow diagram of a communication method 1600 according to some aspects of the present disclosure. Steps of the method 1600 can be executed by a computing device (e.g., a processor, processing circuit, and/or other suitable component) of a wireless communication device or other suitable means for performing the steps. For example, a wireless communication device, such as the UE 115, 215, or 300, may utilize one or more components, such as the processor 302, the memory 304, the HARQ module 308, the transceiver 310, the modem 312, and the one or more antennas 316, to execute the steps of method 1600. The method 1600 may employ similar mechanisms as in the method 500 described above with respect to FIG. 5 and/or the schemes 200, 600, 700, 800, 900, 1000, and/or 1200 described above with respect to FIGS. 6, 7, 8, 9, 10, and/or 12, respectively. As illustrated, the method 1600 includes a number of enumerated steps, but aspects of the method 1600 may include additional steps before, after, and in between the enumerated steps. In some aspects, one or more of the enumerated steps may be omitted or performed in a different order.

At step 1610, the method 1600 includes receiving, by a UE (e.g., the UEs 115, 215, and/or 300) from a BS (e.g., the BSs 105, 205, and/or 400), a configuration indicating a plurality of RVNs (e.g., the set of RVNs 610). In some instances, the UE may correspond to the UE 300 and may utilize one or more components, such as the processor 302, the HARQ module 308, the transceiver 310, the modem 312, and the one or more antennas 316, to receive the configuration.

At step 1620, the method 1600 includes mapping, by the UE, one or more RVNs of the plurality of RVNs to a first set of configured transmission periods (e.g., the slots 206 in the configured resources 240) in a shared radio frequency band (e.g., the frequency band 202). In some instances, the UE may correspond to the UE 300 and may utilize one or more components, such as the processor 302 and the HARQ module 308, to perform the mapping, for example, by implementing the schemes 600, 700, 800, 900, 1000, and/or 1100.

At step 1630, the method 1600 includes transmitting, by the UE to the BS, one or more redundancy versions of a TB (e.g., the TBs 230 and 232) in the shared radio frequency band during one or more configured transmission periods of the first set of configured transmission periods based on the mapping. In some instances, the UE may correspond to the UE 300 and may utilize one or more components, such as the processor 302, the HARQ module 308, the transceiver 310, the modem 312, and the one or more antennas 316, to transmit the one or more redundancy versions of the TB.

In some aspects, the step 1630 includes transmitting, by the UE, each redundancy version of the one or more redundancy versions of the TB during a configured transmission period of the one or more configured transmission periods based on a corresponding RVN for the configured transmission period. In some aspects, the step 1630 transmitting, by the UE, two or more redundancy versions of the TB during two or more consecutive configured transmission periods of the first set of configured transmission periods.

In some aspects, the configuration further indicates a configured order for the plurality of RVNs, and wherein the mapping is based on the configured order. In some aspects, the configured order is based on a capability of the UE. For instance, the capability may be associated with a processing delay of the UE.

In some aspects, the method 1600 includes performing, by the UE, an LBT (e.g., the LBT 250) in the shared radio frequency band, where the step 1630 is performed based on the LBT. In some instances, the UE may correspond to the UE 300 and may utilize one or more components, such as the processor 302, the HARQ module 308, the transceiver 310, the modem 312, and the one or more antennas 316, to perform the LBT, for example, including measuring channel energy an comparing the measured energy to a detection threshold. In some aspects, the step 1620 includes selecting, by the UE, a RVN from the plurality of RVNs for each configured transmission period of the first set of configured transmission periods based on a RV order, the mapping beginning at a configured transmission period associated with a success of the LBT, for example, as discussed in the scheme 600. In some aspects, the step 1620 includes selecting, by the UE, a RVN from the plurality of RVNs for each configured transmission period of the first set of configured transmission periods based on a RV order responsive to an earliest attempt of the LBT, for example, as discussed in the scheme 700. In some aspects, the earliest attempt of the LBT is a failure.

In some aspects, the step 1620 includes repeating one or more RVNs of the plurality of RVNs for the mapping based on a RV order. In some aspects, the configuration further indicates a configured mapping between the plurality of RVNs and the first set of configured transmission periods, for example, as discussed in the scheme 800, and wherein the mapping the one or more RVNs is based on the configured mapping.

In some aspects, a total number of the one or more redundancy versions corresponds to a total number of RVNs in the plurality of RVNs. In some aspects, a total number of the one or more redundancy versions is different from a total number of RVNs in the plurality of RVNs, for example, show in the scheme 900.

In some aspects, the step 1630 includes transmitting, by the UE, a communication signal including UCI (e.g., the UCI 260) and a first redundancy version of the one or more redundancy versions of the TB during a first configured transmission period of the one or more configured transmission periods, the UCI including a bit-width associated with the plurality of RVNs.

In some aspects, the method 1600 includes retransmitting, by the UE, one or more redundancy versions of the TB in the shared radio frequency band during one or more consecutive configured transmission periods of a second set of configured transmission periods. In some aspects, the retransmitting is based on a mapping of the plurality of RVNs to the second set of configured transmission periods. In some aspects, the mapping for the second set of configured transmission periods is the same as the mapping for the first set of configured transmission periods, for example, as discussed in the option 1210 of FIG. 12. In some aspects, the mapping for the second set of configured transmission periods is different from the mapping for the first set of configured transmission periods. In some aspects, the mapping for the second set of configured transmission periods is based on a RVN used for transmitting a last redundancy version of the one or more redundancy versions of the TB in the first set of configured transmission periods, for example, as discussed in the option 1220 of FIG. 12.

Figure 17:
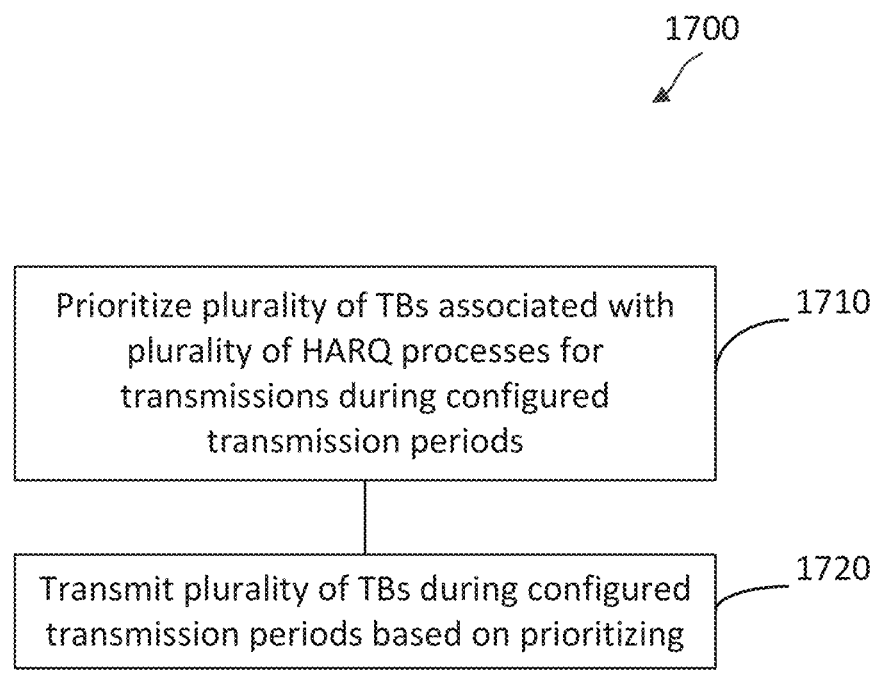
FIG. 17 is a flow diagram of a communication method according to some aspects of the present disclosure.

FIG. 17 is a flow diagram of a communication method 1700 according to some aspects of the present disclosure. Steps of the method 1700 can be executed by a computing device (e.g., a processor, processing circuit, and/or other suitable component) of a wireless communication device or other suitable means for performing the steps. For example, a wireless communication device, such as the UE 115, 215, or 300, may utilize one or more components, such as the processor 302, the memory 304, the HARQ module 308, the transceiver 310, the modem 312, and the one or more antennas 316, to execute the steps of method 1700. The method 1700 may employ similar mechanisms as in the scheme 1300, 1400, and/or 1500 described above with respect to FIGS. 13, 14, and/or 15, respectively. As illustrated, the method 1700 includes a number of enumerated steps, but aspects of the method 1700 may include additional steps before, after, and in between the enumerated steps. In some aspects, one or more of the enumerated steps may be omitted or performed in a different order.

At step 1710, the method 1700 includes prioritizing, by a UE (e.g., the UEs 115, 215, and/or 300), a plurality of TBs (e.g., the TBs 230 and 232) associated with a plurality of HARQ processes (e.g., the HARQ processes 222 H1, H2, . . . , Hn of FIG. 2) for transmission during configured transmission periods (e.g., the slots 206 in the configured resources 240). In other words, the UE may determine the priorities for the plurality of TBs associated with the plurality of HARQ processes for transmission during the configured transmission periods. In some instances, the UE may correspond to the UE 300 and may utilize one or more components, such as the processor 302 and the HARQ module 308, to prioritize the plurality of TBs.

At step 1720, the method 1700 includes transmitting, by the UE to a BS (e.g., the BSs 105, 205, and/or 400), the plurality of TBs in a shared radio frequency band (e.g., the frequency band 202) during the configured transmission periods based on the prioritizing. In other words, the UE may transmit the plurality of TBs in the shared radio frequency band during the configured transmission periods based on the determined priorities. In some instances, the UE may correspond to the UE 300 and may utilize one or more components, such as the processor 302, the HARQ module 308, the transceiver 310, the modem 312, and the one or more antennas 316, to transmit the plurality of TBs.

In some aspects, the step 1710 includes performing the prioritizing based on a TB transmission preparation timing, as discussed in the scheme 1300. In other words, the UE may determine the priorities based on the TB transmission preparation timing. In some aspects, the step 1720 includes prioritizing, by the UE, a retransmission of a first TB of the plurality of TBs over an initial transmission of a second TB of the plurality of the TBs, as discussed in the scheme 1400. In some aspects, the step 1720 includes performing the prioritizing based on data priorities of the plurality of HARQ processes, as discussed in the scheme 1500. In other words, the UE may determine the priorities based on data priorities of the plurality of HARQ processes.

Further embodiments of the present disclosure include a method of wireless communication. The method of wireless communication includes receiving, by a user equipment (UE) from a base station (BS), a configuration indicating a plurality of redundancy version number (RVNs). The method of wireless communication also includes mapping, by the UE, one or more RVNs of the plurality of RVNs to a first set of configured transmission periods in a shared radio frequency band; and transmitting, by the UE to the BS, one or more redundancy versions of a transport block (TB) in the shared radio frequency band during one or more configured transmission periods of the first set of configured transmission periods based on the mapping.

The method may also include one or more of the following features. For instance, the method includes where the transmitting includes transmitting, by the UE, each redundancy version of the one or more redundancy versions of the TB during a configured transmission period of the one or more configured transmission periods based on a corresponding RVN for the configured transmission period. The transmitting includes transmitting, by the UE, two or more redundancy versions of the TB during two or more consecutive configured transmission periods of the first set of configured transmission periods. The configuration further indicates a configured order for the plurality of RVNs, and where the mapping is based on the configured order. The configured order is based on a capability of the UE. The transmitting is based on the LBT. The mapping includes selecting, by the UE, a RVN from the plurality of RVNs for each configured transmission period of the first set of configured transmission periods based on a RV order, the mapping beginning at a configured transmission period associated with a success of the LBT. The mapping includes selecting, by the UE, a RVN from the plurality of RVNs for each configured transmission period of the first set of configured transmission periods based on a RV order responsive to an earliest attempt of the LBT. The earliest attempt of the LBT is a failure. The mapping includes repeating, by the UE, one or more RVNs of the plurality of RVNs for the mapping based on a RV order. The configuration further indicates a configured mapping between the plurality of RVNs and the first set of configured transmission periods, and where the mapping the one or more RVNs is based on the configured mapping. A total number of the one or more redundancy versions corresponds to a total number of RVNs in the plurality of RVNs. A total number of the one or more redundancy versions is different from a total number of RVNs in the plurality of RVNs. The transmitting includes transmitting, by the UE, a communication signal including uplink control information (UCI) and a first redundancy version of the one or more redundancy versions of the TB during a first configured transmission period of the one or more configured transmission periods, the UCI including a bit-width associated with the plurality of RVNs. The method may include retransmitting, by the UE, one or more redundancy versions of the TB in the shared radio frequency band during one or more consecutive configured transmission periods of a second set of configured transmission periods. The retransmitting is based on a mapping of the plurality of RVNs to the second set of configured transmission periods. The mapping for the second set of configured transmission periods is the same as the mapping for the first set of configured transmission periods. The mapping for the second set of configured transmission periods is different from the mapping for the first set of configured transmission periods. The mapping for the second set of configured transmission periods is based on a RVN used for transmitting a last redundancy version of the one or more redundancy versions of the TB in the first set of configured transmission periods.

Further embodiments of the present disclosure include a method of wireless communication. The method of wireless communication includes prioritizing, by a user equipment (UE), a plurality of transport blocks (TBs) associated with a plurality of hybrid automatic repeat request (HARQ) processes for transmission during configured transmission periods; and transmitting, by the UE to a base station (BS), the plurality of TBs in a shared radio frequency band during the configured transmission periods based on the prioritizing. The method may also include one or more of the following features. For instance, the method includes where the prioritizing is based on a TB transmission preparation timing. The prioritizing includes prioritizing, by the UE, a retransmission of a first TB of the plurality of TBs over an initial transmission of a second TB of the plurality of the TBs. The prioritizing is based on data priorities of the plurality of HARQ processes.

Further embodiments of the present disclosure include a user equipment (UE). The user equipment includes a processor configured to map one or more redundancy version numbers (RVNs) of a plurality of RVNs to a first set of configured transmission periods in a shared radio frequency band. The user equipment also includes a transceiver configured to receive, from a base station (BS), a configuration indicating the plurality of RVNs; and transmit, to the BS, one or more redundancy versions of a transport block (TB) in the shared radio frequency band during one or more configured transmission periods of the first set of configured transmission periods based on the mapping.

The UE may also include one or more of the following features. For instance, the UE includes where the transceiver configured to transmit the one or more redundancy versions of the TB is configured to transmit each redundancy version of the one or more redundancy versions of the TB during a configured transmission period of the one or more configured transmission periods based on a corresponding RVN for the configured transmission period. The transceiver configured to transmit the one or more redundancy versions of the TB is configured to transmit two or more redundancy versions of the TB during two or more consecutive configured transmission periods of the first set of configured transmission periods. The configuration further indicates a configured order for the plurality of RVNs, and where the mapping is based on the configured order. The configured order is based on a capability of the UE. The processor is further configured to perform a listen-before-talk (LBT) in the shared radio frequency band; and the transceiver configured to transmit the one or more redundancy versions of the TB is configured to transmit the one or more redundancy versions of the TB based on the LBT. The processor configured to map the one or more RVNs is configured to select a RVN from the plurality of RVNs for each configured transmission period of the first set of configured transmission periods based on a RV order, the mapping beginning at a configured transmission period associated with a success of the LBT. The processor configured to map the one or more RVNs is configured to select a RVN from the plurality of RVNs for each configured transmission period of the first set of configured transmission periods based on a RV order responsive to an earliest attempt of the LBT. The earliest attempt of the LBT is a failure. The processor configured to map the one or more RVNs is configured to repeat one or more RVNs of the plurality of RVNs for the mapping based on a RV order. The configuration further indicates a configured mapping between the plurality of RVNs and the first set of configured transmission periods; and the processor configured to map the one or more RVNs is configured to map the one or more RVNs is based on the configured mapping. A total number of the one or more redundancy versions corresponds to a total number of RVNs in the plurality of RVNs. A total number of the one or more redundancy versions is different from a total number of RVNs in the plurality of RVNs. The transceiver configured to transmit the one or more redundancy versions of the TB is configured to transmit a communication signal including uplink control information (UCI) and a first redundancy version of the one or more redundancy versions of the TB during a first configured transmission period of the one or more configured transmission periods, the UCI including a bit-width associated with the plurality of RVNs. The transceiver is further configured to retransmit one or more redundancy versions of the TB in the shared radio frequency band during one or more consecutive configured transmission periods of a second set of configured transmission periods. The transceiver configured to retransmit the one or more redundancy versions of the TB is configured to retransmit the one or more redundancy versions of the TB based on a mapping of the plurality of RVNs to the second set of configured transmission periods. The mapping for the second set of configured transmission periods is the same as the mapping for the first set of configured transmission periods. The mapping for the second set of configured transmission periods is different from the mapping for the first set of configured transmission periods. The mapping for the second set of configured transmission periods is based on a RVN used for transmitting a last redundancy version of the one or more redundancy versions of the TB in the first set of configured transmission periods.

Further embodiments of the present disclosure include a user equipment (UE). The user equipment includes a processor configured to prioritize a plurality of transport blocks (TBs) associated with a plurality of hybrid automatic repeat request (HARQ) processes for transmission during configured transmission periods; and a transceiver configured to transmit, to a base station (BS), the plurality of TBs in a shared radio frequency band during the configured transmission periods based on the prioritizing.

The UE may also include one or more of the following features. For instance, the UE includes where the processor configured to prioritize the plurality of TBs is configured to prioritize the plurality of TBs based on a TB transmission preparation timing. The processor configured to prioritize the plurality of TBs is configured to prioritize a retransmission of a first TB of the plurality of TBs over an initial transmission of a second TB of the plurality of the TBs. The processor configured to prioritize the plurality of TBs is configured to prioritize the plurality of TBs based on data priorities of the plurality of HARQ processes.

Further embodiments of the present disclosure include a non-transitory computer-readable medium having program code recorded thereon. The non-transitory computer-readable medium includes code for causing a user equipment (UE) to receive, from a base station (BS), a configuration indicating a plurality of redundancy version number (RVNs). The non-transitory computer-readable medium also includes code for causing the UE to map one or more RVNs of the plurality of RVNs to a first set of configured transmission periods in a shared radio frequency band; and code for causing the UE to transmit, to the BS, one or more redundancy versions of a transport block (TB) in the shared radio frequency band during one or more configured transmission periods of the first set of configured transmission periods based on the mapping.

The non-transitory computer-readable medium may also include one or more of the following features. For instance, the non-transitory computer-readable medium includes where the code for causing the UE to transmit the one or more redundancy versions of the TB is configured to transmit each redundancy version of the one or more redundancy versions of the TB during a configured transmission period of the one or more configured transmission periods based on a corresponding RVN for the configured transmission period. The code for causing the UE to transmit the one or more redundancy versions of the TB is configured to transmit two or more redundancy versions of the TB during two or more consecutive configured transmission periods of the first set of configured transmission periods. The configuration further indicates a configured order for the plurality of RVNs, and where the mapping is based on the configured order. The configured order is based on a capability of the non-transitory computer-readable medium. The code for causing the UE to transmit the one or more redundancy versions of the TB is configured to transmit the one or more redundancy versions of the TB based on the LBT. The code for causing the UE to map the one or more RVNs is configured to select a RVN from the plurality of RVNs for each configured transmission period of the first set of configured transmission periods based on a RV order, the mapping beginning at a configured transmission period associated with a success of the LBT. The code for causing the UE to map the one or more RVNs is configured to select a RVN from the plurality of RVNs for each configured transmission period of the first set of configured transmission periods based on a RV order responsive to an earliest attempt of the LBT. The earliest attempt of the LBT is a failure. The code for causing the UE to map the one or more RVNs is configured to repeat one or more RVNs of the plurality of RVNs for the mapping based on a RV order. The configuration further indicates a configured mapping between the plurality of RVNs and the first set of configured transmission periods; and the code for causing the UE to map the one or more RVNs is configured to map the one or more RVNs is based on the configured mapping. A total number of the one or more redundancy versions corresponds to a total number of RVNs in the plurality of RVNs. A total number of the one or more redundancy versions is different from a total number of RVNs in the plurality of RVNs. The code for causing the UE to transmit the one or more redundancy versions of the TB is configured to transmit a communication signal including uplink control information (UCI) and a first redundancy version of the one or more redundancy versions of the TB during a first configured transmission period of the one or more configured transmission periods, the UCI including a bit-width associated with the plurality of RVNs. The non-transitory computer-readable medium may include code for causing the UE to retransmit one or more redundancy versions of the TB in the shared radio frequency band during one or more consecutive configured transmission periods of a second set of configured transmission periods. The code for causing the UE to retransmit the one or more redundancy versions of the TB is configured to retransmit the one or more redundancy versions of the TB based on a mapping of the plurality of RVNs to the second set of configured transmission periods. The mapping for the second set of configured transmission periods is the same as the mapping for the first set of configured transmission periods. The mapping for the second set of configured transmission periods is different from the mapping for the first set of configured transmission periods. The mapping for the second set of configured transmission periods is based on a RVN used for transmitting a last redundancy version of the one or more redundancy versions of the TB in the first set of configured transmission periods.

Further embodiments of the present disclosure include a non-transitory computer-readable medium having program code recorded thereon. The non-transitory computer-readable medium includes code for causing a user equipment (UE) to prioritize a plurality of transport blocks (TBs) associated with a plurality of hybrid automatic repeat request (HARQ) processes for transmission during configured transmission periods; and code for causing the UE to transmit, to a base station (BS), the plurality of TBs in a shared radio frequency band during the configured transmission periods based on the prioritizing.

The non-transitory computer-readable medium may also include one or more of the following features. For instance, the non-transitory computer-readable medium includes where the code for causing the UE to prioritize the plurality of TBs is configured to prioritize the plurality of TBs based on a TB transmission preparation timing. The code for causing the UE to prioritize the plurality of TBs is configured to prioritize a retransmission of a first TB of the plurality of TBs over an initial transmission of a second TB of the plurality of the TBs. The code for causing the UE to prioritize the plurality of TBs is configured to prioritize the plurality of TBs based on data priorities of the plurality of HARQ processes.

Further embodiments of the present disclosure include a user equipment (UE). The user equipment includes means for receive, from a base station (BS), a configuration indicating a plurality of redundancy version number (RVNs). The user equipment also includes means for mapping one or more RVNs of the plurality of RVNs to a first set of configured transmission periods in a shared radio frequency band; and means for transmitting, to the BS, one or more redundancy versions of a transport block (TB) in the shared radio frequency band during one or more configured transmission periods of the first set of configured transmission periods based on the mapping.

The UE may also include one or more of the following features. For instance, the UE includes where the means for transmitting the one or more redundancy versions of the TB is configured to transmit each redundancy version of the one or more redundancy versions of the TB during a configured transmission period of the one or more configured transmission periods based on a corresponding RVN for the configured transmission period. The means for transmitting the one or more redundancy versions of the TB is configured to transmit two or more redundancy versions of the TB during two or more consecutive configured transmission periods of the first set of configured transmission periods. The configuration further indicates a configured order for the plurality of RVNs, and where the mapping is based on the configured order. The configured order is based on a capability of the UE. The means for transmitting the one or more redundancy versions of the TB is configured to transmit the one or more redundancy versions of the TB based on the LBT. The means for mapping the one or more RVNs is configured to select a RVN from the plurality of RVNs for each configured transmission period of the first set of configured transmission periods based on a RV order, the mapping beginning at a configured transmission period associated with a success of the LBT. The means for mapping the one or more RVNs is configured to select a RVN from the plurality of RVNs for each configured transmission period of the first set of configured transmission periods based on a RV order responsive to an earliest attempt of the LBT. The earliest attempt of the LBT is a failure. The means for mapping the one or more RVNs is configured to repeat one or more RVNs of the plurality of RVNs for the mapping based on a RV order. The configuration further indicates a configured mapping between the plurality of RVNs and the first set of configured transmission periods; and the means for mapping the one or more RVNs is configured to map the one or more RVNs is based on the configured mapping. A total number of the one or more redundancy versions corresponds to a total number of RVNs in the plurality of RVNs. A total number of the one or more redundancy versions is different from a total number of RVNs in the plurality of RVNs. The means for transmitting the one or more redundancy versions of the TB is configured to transmit a communication signal including uplink control information (UCI) and a first redundancy version of the one or more redundancy versions of the TB during a first configured transmission period of the one or more configured transmission periods, the UCI including a bit-width associated with the plurality of RVNs. The UE may include means for retransmitting one or more redundancy versions of the TB in the shared radio frequency band during one or more consecutive configured transmission periods of a second set of configured transmission periods. The means for retransmitting the one or more redundancy versions of the TB is configured to retransmit the one or more redundancy versions of the TB based on a mapping of the plurality of RVNs to the second set of configured transmission periods. The mapping for the second set of configured transmission periods is the same as the mapping for the first set of configured transmission periods. The mapping for the second set of configured transmission periods is different from the mapping for the first set of configured transmission periods. The mapping for the second set of configured transmission periods is based on a RVN used for transmitting a last redundancy version of the one or more redundancy versions of the TB in the first set of configured transmission periods.

Further embodiments of the present disclosure include a user equipment (UE). The user equipment includes means for prioritizing a plurality of transport blocks (TBs) associated with a plurality of hybrid automatic repeat request (HARQ) processes for transmission during configured transmission periods; and means for transmitting, to a base station (BS), the plurality of TBs in a shared radio frequency band during the configured transmission periods based on the prioritizing.

The UE may also include one or more of the following features. For instance, the UE includes where the means for prioritizing the plurality of TBs is configured to prioritize the plurality of TBs based on a TB transmission preparation timing. The means for prioritizing the plurality of TBs is configured to prioritize a retransmission of a first TB of the plurality of TBs over an initial transmission of a second TB of the plurality of the TBs. The means for prioritizing the plurality of TBs is configured to prioritize the plurality of TBs based on data priorities of the plurality of HARQ processes.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a user equipment (UE), priorities for a plurality of transport blocks (TBs) associated with a plurality of hybrid automatic repeat request (HARQ) processes for transmission during configured transmission periods, wherein the priorities for the plurality of TBs are based on latencies of data associated with the plurality of TBs;
   receiving, from a network entity, a first redundancy version (RV) sequence;
   selecting a second RV sequence, the selecting of the second RV sequence being independent of the received first RV sequence; and
   transmitting, by the UE to the network entity, the plurality of TBs in a shared radio frequency band during the configured transmission periods based on the determined priorities and the second RV sequence.

2. The method of claim 1, wherein:
   the determining the priorities is based on a TB transmission preparation timing; and
   the second RV sequence is different from the first RV sequence.

3. The method of claim 1, wherein the determining the priorities includes:
   prioritizing, by the UE, a retransmission of a first TB of the plurality of TBs over an initial transmission of a second TB of the plurality of TBs; and
   determining the priorities for the plurality of TBs while operating in the shared radio frequency band.

4. The method of claim 3, further comprising:
   selecting, by the UE, a first redundancy version number (RVN) for the retransmission of the first TB.

5. The method of claim 4, wherein the transmitting comprises:
   transmitting, by the UE to the network entity during a first configured transmission period of the configured transmission periods, an initial transmission of the first TB;
   transmitting, by the UE to the network entity during a second configured transmission period of the configured transmission periods after the first configured transmission period, the retransmission of the first TB based on the selected RVN; and
   transmitting, by the UE to the network entity during a third configured transmission period of the configured transmission periods after the second configured transmission period based on the determined priorities, the initial transmission of the second TB.

6. The method of claim 5, wherein the transmitting the retransmission of the first TB comprises:
   transmitting, by the UE to the network entity based on a RVN sequence including the first RVN, a plurality of redundancy versions of the first TB.

7. The method of claim 1, wherein the determining the priorities is further based on data priorities of the plurality of HARQ processes.

8. The method of claim 1, further comprising:
   receiving, by the UE from the network entity, a configured grant for the configured transmission periods.

9. A user equipment (UE) comprising:
   a memory;
   a transceiver; and
   at least one processor coupled to the memory and the transceiver, wherein the at least one processor is configured to:
   determine priorities for a plurality of transport blocks (TBs) associated with a plurality of hybrid automatic repeat request (HARQ) processes for transmission during configured transmission periods, wherein the priorities for the plurality of TBs are based on latencies of data associated with the plurality of TBs;
   the transceiver configured to receive, from a network entity, a first redundancy version (RV) sequence;
   the at least one processor configured to select a second RV sequence independent of the received first RV sequence; and
   the transceiver configured to transmit, to the network entity, the plurality of TBs in a shared radio frequency band during the configured transmission periods based on the determined priorities and the second RV sequence.

10. The UE of claim 9, wherein the second RV sequence is different from the first RV sequence and the at least one processor is further configured to:
    determine the priorities for the plurality of TBs based on a TB transmission preparation timing.

11. The UE of claim 9, wherein the at least one processor is further configured to:
    prioritize a retransmission of a first TB of the plurality of TBs over an initial transmission of a second TB of the plurality of TBs; and
    determine the priorities for the plurality of TBs while operating in the shared radio frequency band.

12. The UE of claim 11, wherein the at least one processor is further configured to:
    select a redundancy version number (RVN) for the retransmission of the first TB.

13. The UE of claim 12, wherein the transceiver is further configured to:
    transmit, to the network entity during a first configured transmission period of the configured transmission periods, an initial transmission of the first TB;
    transmit, to the network entity during a second configured transmission period of the configured transmission periods after the first configured transmission period, the retransmission of the first TB based on the selected RVN; and transmit, to the network entity during a third configured transmission period of the configured transmission periods after the second configured transmission period based on the determined priorities, the initial transmission of the second TB.

14. The UE of claim 13, wherein the transceiver is further configured to:
  transmit, to the network entity based on a RVN sequence including the RVN, a plurality of redundancy versions of the first TB for the retransmission of the first TB.

15. The UE of claim 9, wherein the transceiver is further configured to:
  determine the priorities for the plurality of TBs further based on data priorities of the plurality of HARQ processes.

16. The UE of claim 9, wherein the transceiver is further configured to:
  receive, from the network entity, a configured grant for the configured transmission periods.

17. A non-transitory computer-readable medium having program code recorded thereon, the program code comprising:
  code for causing a user equipment (UE) to determine priorities for a plurality of transport blocks (TBs) associated with a plurality of hybrid automatic repeat request (HARQ) processes for transmission during configured transmission periods, wherein the priorities for the plurality of TBs are based on latencies of data associated with the plurality of TBs;
  code for causing the UE to receive, from a network entity, a first redundancy version (RV) sequence;
  code for causing the UE to select a second RV sequence, the selecting of the second RV sequence being independent of the received first RV sequence; and
  code for causing the UE to transmit, to the network entity, the plurality of TBs in a shared radio frequency band during the configured transmission periods based on the determined priorities and the second RV sequence.

18. The non-transitory computer-readable medium of claim 17, wherein the second RV sequence is different from the first RV sequence and the code for causing the UE to determine the priorities for the plurality of TBs is configured to:
  determine the priorities for the plurality of TBs based on a TB transmission preparation timing.

19. The non-transitory computer-readable medium of claim 17, wherein the code for causing the UE to determine the priorities for the plurality of TBs is configured to:
  prioritize a retransmission of a first TB of the plurality of TBs over an initial transmission of a second TB of the plurality of TBs; and
  determine the priorities while operating in the shared radio frequency band.

20. The non-transitory computer-readable medium of claim 19, further comprising:
  code for causing the UE to select a redundancy version number (RVN) for the retransmission of the first TB.

21. The non-transitory computer-readable medium of claim 20, wherein code for causing the UE to transmit the plurality of TBs is further configured to:
  transmit, to the network entity during a first configured transmission period of the configured transmission periods, an initial transmission of the first TB;
  transmit, to the network entity during a second configured transmission period of the configured transmission periods after the first configured transmission period, the retransmission of the first TB based on the selected RVN; and
  transmit, to the network entity during a third configured transmission period of the configured transmission periods after the second configured transmission period based on the determined priorities, the initial transmission of the second TB.

22. The non-transitory computer-readable medium of claim 21, wherein the code for causing the UE to transmit the retransmission of the of the first TB is further configured to:
  transmit, to the network entity based on a RVN sequence including the RVN, a plurality of redundancy versions of the first TB.

23. The non-transitory computer-readable medium of claim 17, wherein the code for causing the UE to determine the priorities for the plurality of TBs is configured to:
  determine the priorities for the plurality of TBs further based on data priorities of the plurality of HARQ processes.

24. A user equipment (UE) comprising:
  means for determining priorities for a plurality of transport blocks (TBs) associated with a plurality of hybrid automatic repeat request (HARQ) processes for transmission during configured transmission periods, wherein the priorities for the plurality of TBs are based on latencies of data associated with the plurality of TBs;
  means for receiving, from a network entity, a first redundancy version (RV) sequence;
  means for selecting a second RV sequence, the selecting of the second RV sequence being independent of the received first RV sequence; and
  means for transmitting, to the network entity, the plurality of TBs in a shared radio frequency band during the configured transmission periods based on the determined priorities and the second RV sequence.

25. The UE of claim 24, wherein the second RV sequence is different from the first RV sequence and the means for determining the priorities for the plurality of TBs is configured to:
  determine the priorities for the plurality of TBs based on a TB transmission preparation timing.

26. The UE of claim 24, wherein the means for determining the priorities for the plurality of TBs is configured to:
  prioritize a retransmission of a first TB of the plurality of TBs over an initial transmission of a second TB of the plurality of TBs; and
  determine the priorities while operating in the shared radio frequency band.

27. The UE of claim 26, further comprising:
  means for selecting a redundancy version number (RVN) for the retransmission of the first TB.

28. The UE of claim 27, wherein the means for transmitting the plurality of TBs is further configured to:
  transmit, to the network entity during a first configured transmission period of the configured transmission periods, an initial transmission of the first TB;
  transmit, to the network entity during a second configured transmission period of the configured transmission periods after the first configured transmission period, the retransmission of the first TB based on the selected RVN; and
  transmit, to the network entity during a third configured transmission period of the configured transmission periods after the second configured transmission period based on the determined priorities, the initial transmission of the second TB.

29. The UE of claim 28, wherein the means for transmitting: the plurality of TBs is further configured to:
transmit, to the network entity based on a RVN sequence including the RVN, a plurality of redundancy versions of the first TB for the retransmission of the first TB.

30. The UE of claim 24, wherein the means for determining the priorities for the plurality of TBs is configured to:
determine the priorities for the plurality of TBs further based on data priorities of the plurality of HARQ processes.

* * * * *